Feb. 22, 1955 G. C. GRAHAM Re. 23,951

WASHING MACHINE HAVING FLEXIBLE EXTRACTOR AND AUTOMATIC CONTROLS

Original Filed March 17, 1949 11 Sheets-Sheet 1

INVENTOR.
George C. Graham
BY
M. Theodore Simmons
ATTORNEY

Feb. 22, 1955 G. C. GRAHAM Re. 23,951

WASHING MACHINE HAVING FLEXIBLE EXTRACTOR AND AUTOMATIC CONTROLS

Original Filed March 17, 1949 11 Sheets-Sheet 2

INVENTOR.
George C. Graham
BY
M. Theodore Simmons
ATTORNEY

INVENTOR.
George C. Graham
BY
M. Theodore Simmons
ATTORNEY

Feb. 22, 1955 G. C. GRAHAM Re. 23,951

WASHING MACHINE HAVING FLEXIBLE EXTRACTOR AND AUTOMATIC CONTROLS

Original Filed March 17, 1949 11 Sheets-Sheet 4

INVENTOR.
George C. Graham
BY
M. Theodore Simmons
ATTORNEY

Feb. 22, 1955 G. C. GRAHAM Re. 23,951

WASHING MACHINE HAVING FLEXIBLE EXTRACTOR AND AUTOMATIC CONTROLS

Original Filed March 17, 1949 11 Sheets-Sheet 5

INVENTOR.
George C. Graham
BY
M. Theodore Simmons
ATTORNEY

INVENTOR.
George C. Graham
BY
M. Theodore Simmons
ATTORNEY.

INVENTOR.
George C. Graham
BY
N. Theodore Simmons
ATTORNEY

Feb. 22, 1955 G. C. GRAHAM Re. 23,951

WASHING MACHINE HAVING FLEXIBLE EXTRACTOR AND AUTOMATIC CONTROLS

Original Filed March 17, 1949 11 Sheets-Sheet 8

INVENTOR.
George C. Graham
BY
M. Theodore Simmons
ATTORNEY

INVENTOR.
George C. Graham
BY
M. Hudson Simmons
ATTORNEY

INVENTOR.
George C. Graham
BY
M. Theodore Simmons
ATTORNEY

INVENTOR.
George C. Graham
BY
N. Theodore Simmons
ATTORNEY

United States Patent Office

Re. 23,951
Reissued Feb. 22, 1955

23,951

WASHING MACHINE HAVING FLEXIBLE EXTRACTOR AND AUTOMATIC CONTROLS

George C. Graham, Ridgewood, N. J., assignor to Graham and Barker, Ridgewood, N. J., a partnership Original No. 2,657,564, dated November 3, 1953, Serial No. 81,940, March 17, 1949. Application for reissue February 1, 1954, Serial No. 407,623

46 Claims. (Cl. 68—12)

Matter enclosed in heavy brackets [ ] appears in the original patent but forms no part of this reissue specification; matter printed in italics indicates the additions made by reissue.

This invention relates to improvements in washing machines, and more particularly washing machines to rinse and dry as well as wash the clothes while they remain in the same chamber.

This application is a continuation-in-part of my copending application, Serial No. 421,875, filed December 6, 1941, now abandoned, and the machines, according to the embodiments of the invention herein disclosed, are of the type shown in said application together with certain improvements and advancements which, if employed, permit the machine to be operated either manually or as an automatic machine in which the various operations of washing, rinsing and drying are carried out in a predetermined cycle by the mechanism itself, and without attention on the part of the operator other than the preliminary ones of charging the machine with the clothes to be washed, the addition of water, soap or washing compound, the setting of the machine for the length of time of washing desired, for example, twenty minutes, fifteen minutes, ten minutes; and finally the removal of the finished wash for hanging up or ironing.

The machine, according to the embodiments of the invention herein disclosed, is of the movable agitator type, with a squeeze dryer. In machines of this type, the tub is usually stationary, has therein a movable element for agitating the clothes and the water, and contains a flexible liner which constitutes the clothes holding chamber during the washing operation. When water is to be expelled, the flexible element moves inwardly under pressure of a fluid, squeezing the clothes, which action discharges the water through various drains provided and leaves the clothes in a damp dry condition. Rinsing is accomplished by admitting new water to the tub, and agitating the clothes during the rinse, if desired.

In washing machines of the general type to which my invention relates, one of the problems encountered is to dispose readily of the water or fluid, after each of the washing and rinsing operations, and especially to dispose of the accumulated solid matter which represents removed soil, and which must not be left on or in the clothes when the washing, rinsing and drying operations are completed. In the past, with certain types of machines, this has been particularly troublesome because this accumulated matter in large part floats on top of the water in which the clothes are being washed or rinsed, and is carried back down into the clothes when the water level in the machine goes down as the water is drained or removed.

Another difficulty in washing machines of the class described is to remove all of the water, soap suds and soil matter both on the top and the bottom of the mass of clothes contained in the tub.

Still another difficulty is to insure that there is the proper amount of water in the tub for each washing and rinsing operation, irrespective of variations in water pressure either in an individual machine in use in a particular locality or in different machines of the same type operated in different localities.

It is an object of this invention to provide a machine of the class described in which the floatable accumulated soil matter is continually removed from the washing chamber, or tub, during both washing and rinsing operations.

It is another object of this invention to provide a machine which is particularly economical in the use of water, thereby reducing the cost of operation both for the cost of the water itself and of heating it, by providing a machine employing a minimum quantity of water and utilizing the water to the highest efficiency by constantly removing from the water the more or less solid dirt, dust, etc., taken out of the clothes.

It is another object of this invention to provide a washing machine of the class described in which the quantities of water added to the washing chamber are measured to maintain the proper water level regardless of the amount of pressure of the water supply, and without the use of pumps or other devices to compensate for variations or changes in the water pressure.

It is another object of this invention to provide an improved combination of agitator washer and squeeze dryer, arranged so as to provide highly efficient washing and rinsing actions, and a highly efficient drying action without interference by the agitator, all occurring in the same tub and preferably in sequential operations.

Other objects of this invention are to provide an improved form of flexible diaphragm for drying the clothes in the same chamber in which they are washed or rinsed; means to compensate for any reduction in water level in the tub caused by any trapped air, or the like, during the filling of the tub with water; various economies in the construction of the washing apparatus per se to reduce substantially the cost of manufacture of the machine as well as the maintenance cost thereof; and improved control mechanism for providing automatic operation of the machine in a predetermined cycle, including a novel, self-contained control unit, an improved mechanism for regulating the temperature of the water admitted to the machine, and positive acting protective mechanisms.

Still other objects and advantages of my invention will be apparent from the specification.

The features of novelty, which I believe to be characteristic of my invention, are set forth with particularity in the appended claims. My invention itself, however, both as to its fundamental principles, and as to its particular embodiments, will best be understood from the specification and accompanying drawings in which—

Figure 1:
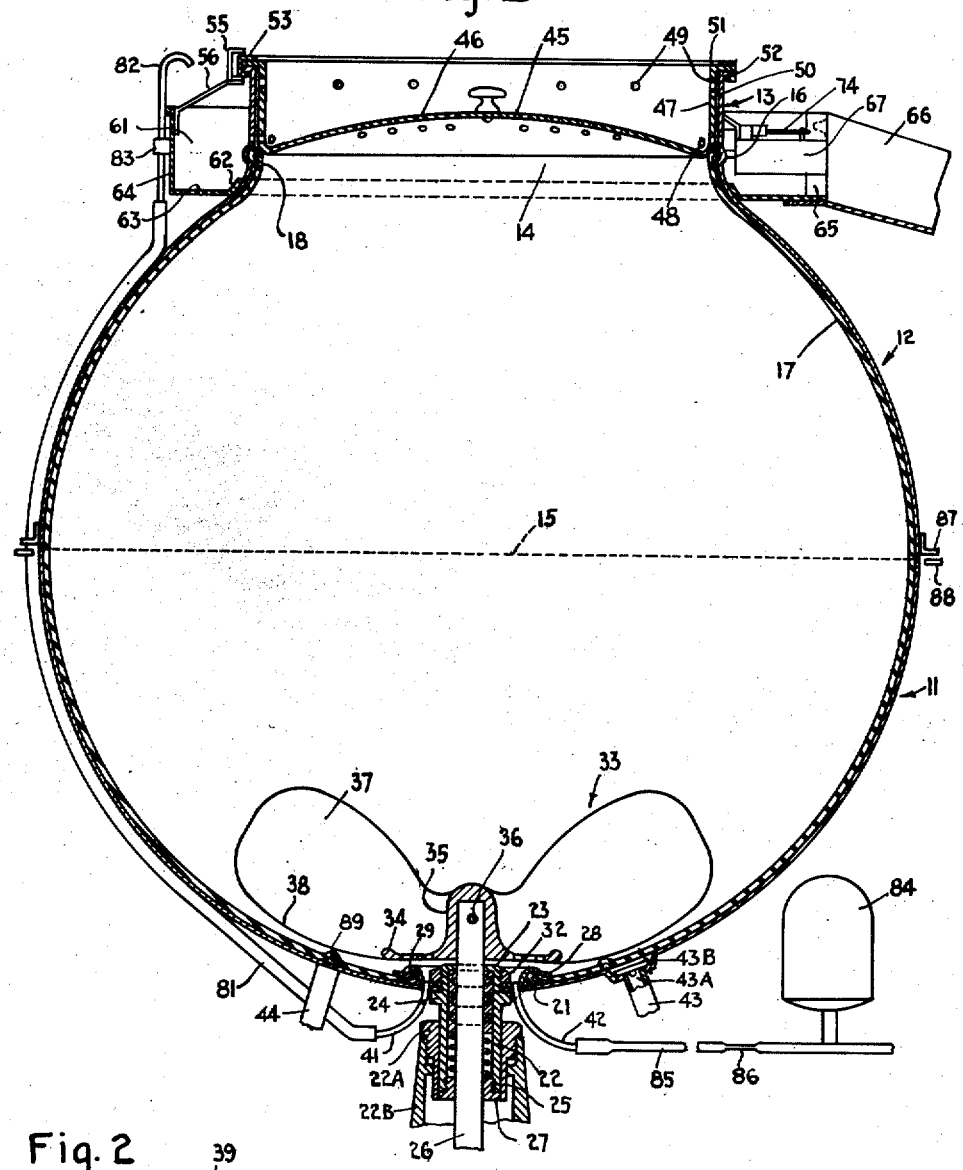
Fig. 1 is a vertical central section through a washing machine tub and associated apparatus, according to one embodiment of the present invention.
Figure 2:
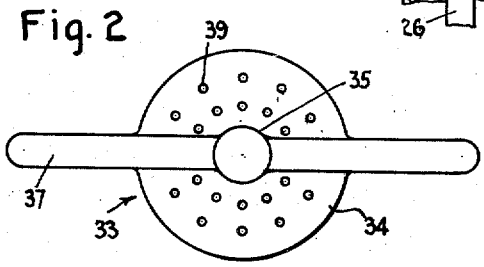
Fig. 2 is a plan view of the agitator of Fig. 1.
Figure 3:
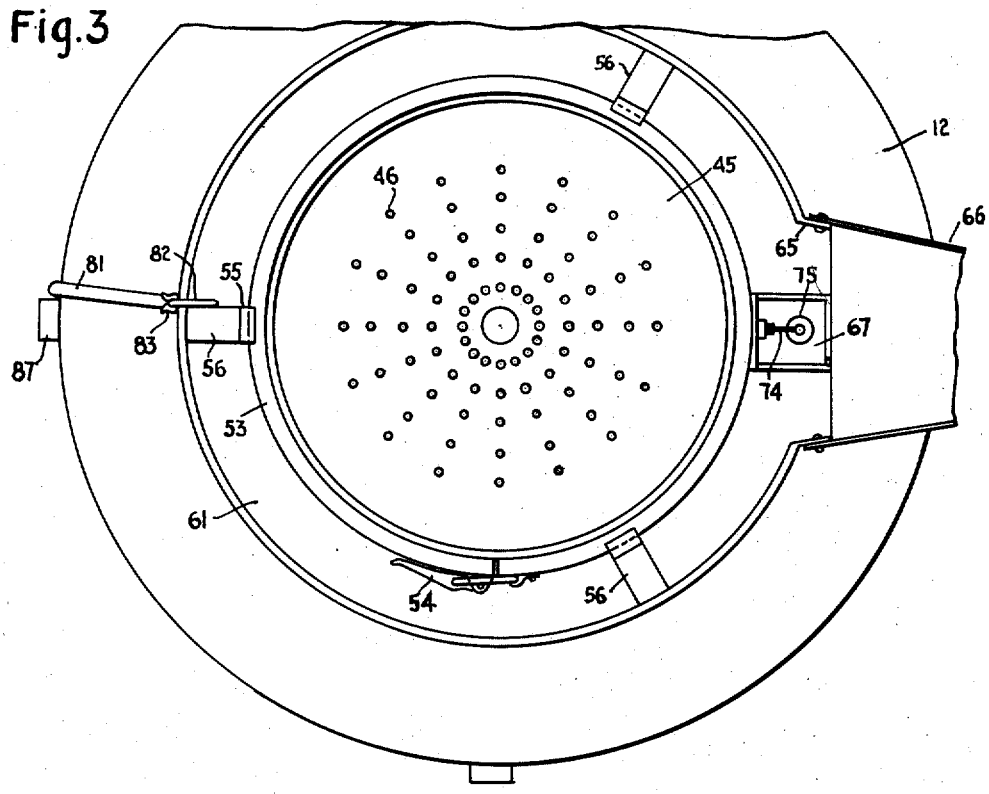
Fig. 3 is a plan view with parts broken away of the washing machine tub of Fig. 1.

Referring first to Figs. 1 to 6, the washing machine tub is substantially spherical in shape and comprises a bottom portion 11, the shape of a hemisphere, and an upper portion 12 which is also generally hemispherical in shape except at the top where there is an upstanding collar 13 surrounding a central opening 14, which affords access to the interior of the tub. The meeting edges of the assembled top and bottom portions 11 and 12 are butt welded together along the line indicated at 15, thus making a unitary structure of economical manufacture. An external bead 16 is provided near the base of the collar 13.

The sides of the interior of the tub are lined with a rubber or other flexible diaphragm 17. At its upper end the diaphragm is folded around (see Fig. 5) a wire or similar spring metal band 18, which is arranged to snap into the interior of the bead 16, leaving a free end flap 19 of the diaphragm lying between the tub portion 12 and the diaphragm 17. At its lower end the diaphragm is similarly folded around a ring 21 (Fig. 6) with the free end of the diaphragm also extending as a circular flap between the body portion 11 of the tub and the body of the diaphragm. The enclosed ring 21 rests upon the tub bottom and very close to the axis of the tub as will be more fully explained. The diaphragm is a continuous, one-piece band extending from the upper ring 18 to the lower ring 21 and normally fits snugly against the sides of both sections of the tub around its entire interior circumference. The operation and use of the diaphragm will be explained later.

At the bottom of the tub is a central opening in which is mounted a stuffing box 22 which has an upper externally screw-threaded part 23, an intermediate annular shoulder 24 and a lower internally screw-threaded part 25. A shaft 26 extends through this stuffing box and into the interior of the tub. At its lower end the shaft is connected to suitable mechanism to oscillate the shaft about its axis but this mechanism, forming no part of the present invention, is not shown. The interior of the stuffing box 22 is suitably packed around the shaft to prevent leakage and it is closed at its lower end by a screw-threaded follower 27 engaging the lower screw-threaded part 25. The stuffing box assembly may be slidably mounted in a sleeve nut 22A, which is part of an extension 22B of a gear housing of the oscillating drive for the shaft 26, to allow for the effects of pressures on the mechanism during the squeeze drying of the clothes hereinafter described.

A somewhat dish-shaped clamping plate 28, having an annular bead 29 near the edge thereof, fits about the upper end 23 of the stuffing box 22 so that the bead 29 houses that part of the diaphragm which encloses the ring 21, and thus this plate positions and retains the lower end of the diaphragm. A gasket 31 is interposed between the plate 28 and the exposed bottom of the tub, and the whole stuffing box assembly, together with the plate, is held in place by a nut 32 which engages the upper screw-threaded part 23 of the stuffing box and draws the parts into water-tight connection against the shoulder 24.

The upper protruding end of the shaft 26 carries an agitator 33, which may be of any suitable form. That shown comprises a substantially flat disc 34, which lies close to the top of the clamping plate 28, and a short upstanding post 35, which is appropriately secured to the end of the shaft 26, as by a pin 36. The agitator carries a pair of blades 37 which extend outwardly and upwardly from the agitator disc on opposite sides of the center post 35, and each blade has a lower edge 38 with but a small clearance from the rubber diaphragm 17 and conforming somewhat to the contour of the tub for a substantial portion of its radial length, so as to cause an upward surge of the water along the sides of the tub as the agitator is oscillated. As will be seen from Fig. 2, the agitator blades 37 have a substantial width, tapering downwardly and outwardly and blending with the curve of the diaphragm disc 34 and post 35 which, as seen from Fig. 1, is downwardly and outwardly from the central post. The disc 34 also is provided with a large number of perforations 39, the purpose of which will be explained.

In the annular space between the end of the diaphragm defined by the ring 21 and the lock nut 32, the tub is provided with a drain connection 41 and a water inlet connection 42, both of which connections communicate with the interior of the tub beneath the agitator disc 34, and through suitable openings in the clamping plate 28. The tub is also provided near its bottommost level with a connection 43 for the admission of water or other fluid for the operation of the diaphragm 17, and an outlet connection 44 therefor. These connections will be provided with suitable valve mechanisms (not shown) for the control of the operations. The inlet connection 43 may be closed by a weighted flap 43A which is hinged in a suitable recess in the tub as shown at 43B.

The access opening 14 of the tube is closed by means of a removable cover, which has an arched bottom 45, the entire center area of which is perforated as indicated at 46, and upwardly extending side walls 47, also having a row of perforations near the bottom thereof, as indicated at 48, and an upper row of perforations 49, which may be less in number than the perforations 48. It will be noted from Figs. 1 and 5 that there is a slight space 50 between the collar 13 of the tub and the side walls 47 of the cover when the cover is in locked position, but that the lower edge of the cover has a water tight fit with the rubber of the diaphragm 17 where it surrounds the ring 18, thus completing the enclosure of the space 50. The cover apertures 48 and 49 open into this space.

At its upper end the cover has a lateral flange 51 overlying a similar flange 52 on the upper edge of the collar 13 of the tub. The cover is secured in place on the tub by means of the annular, channel-shaped, expansible ring 53 which fits over the flanges 51 and 52 and has a suitable clamp 54 (Fig. 3) secured respectively to the opposite ends of the ring and operable to lock the ring in closed position. The ring 53 is supported and loosely held in a plurality of channeled shaped holders 55 each of which is, in turn, carried by a bracket 56 that is mounted at its lower end in a trough 61. These holders receive the ring 53 when it is expanded for the removal of the cover from the tub, and also serve to guide the ring into proper position for clamping the flanges 51 and 52 of the cover and tub respectively when the cover is to be locked in place.

The ring-shaped trough 61 is mounted on the outside of the tub and has an upturned internal flange 62 which is welded to the tub just below the junction between the collar 13 and the hemispherical portion of the top portion 12 of the tub, thereby reinforcing the tub at this junction. The trough also comprises a bottom 63 and a vertical wall 64, the trough being open at its top. At one side the wall 64 is cut away and the edges are flanged outwardly, as indicated at 65 in Fig. 3, to provide a drain outlet from the trough. A drain board 66 is pivotally connected to the flanges 65, this board being of sufficient length to extend outwardly beyond the sides of the tub, or its cabinet, to permit draining of the water from the trough 61 into a sink or stationary tub. Either the trough or the tub will be mounted at a slight angle to drain toward the drain board 66.

Figure 5:
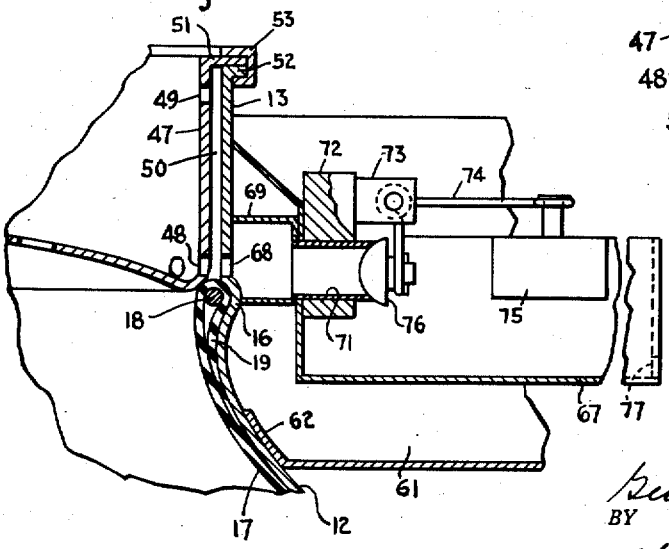
Fig. 5 is a fragmentary view, also in enlarged detail, showing the mechanism of Fig. 4 in vertical section.
Figure 4:
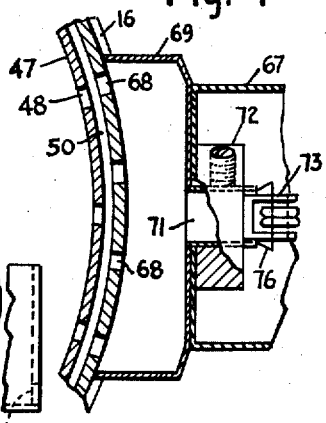
Fig. 4 is a fragmentary plan view in enlarged detail of the float valve drain control.
Figure 6:
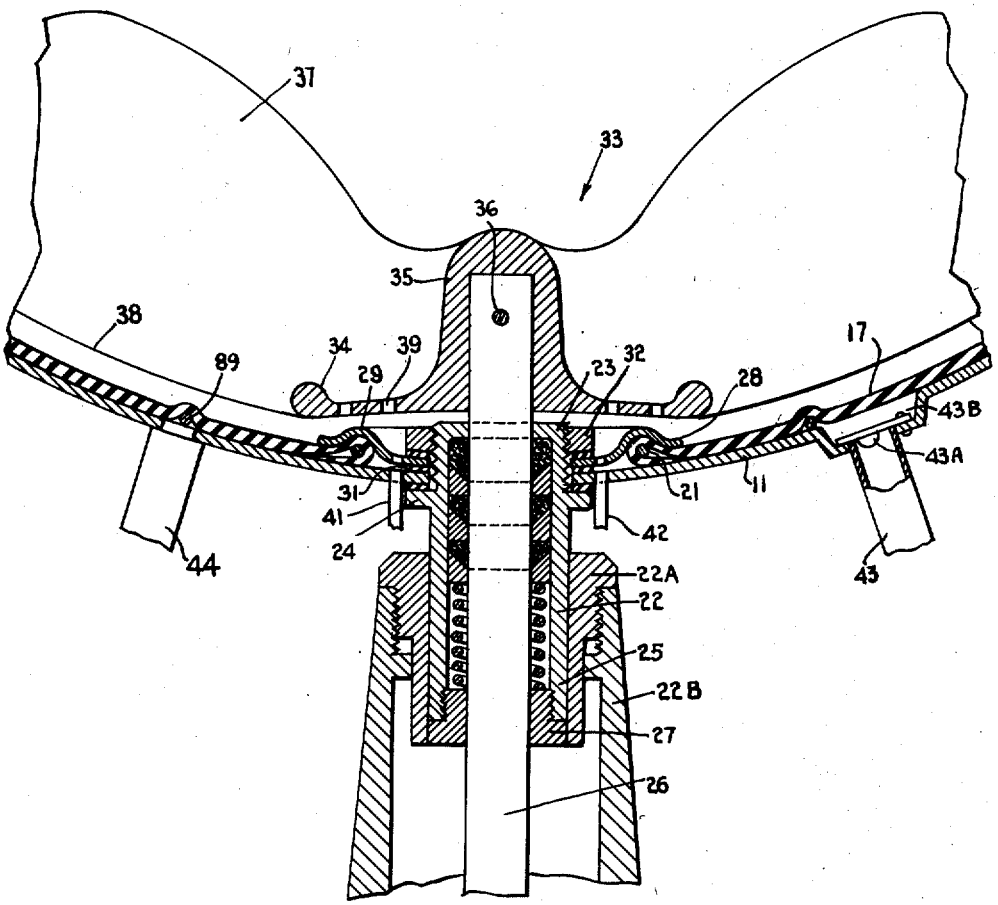
Fig. 6 is an enlarged detail of the construction adjacent the tub bottom and the agitator mounting in Fig. 1.

Referring to Figs. 4 and 5, an auxiliary drain control comprises a pan 67 mounted in the trough, the pan being open at its top and constituting a float chamber. A portion of the collar 13 of the tub has a few perforations 68 which communicate with the annular space 50 between the collar and the side wall 47 of the cover. A cap 69 covers the openings 68 on the outside and it has a single large opening, in one side thereof, in which is mounted an outlet tube 71. A collar 72 is secured about the projecting portion of this tube and has a pair of outwardly extending ears 73 between which is pivotally mounted a somewhat L-shaped arm 74. The outer end of arm 74 carries a float 75, suspended in the pan 67, and the other portion of the arm carries a stopper 76, which is loosely mounted therein but arranged to normally seal the opening of the tube 71. The pan 67 has a small opening 77 in its outer or lower wall for the draining thereof.

Returning now to Fig. 1, a hose 81 at one end fits over the drain outlet connection 41 for the tub and at its upper end carries a hook-shaped tube 82 which opens into the trough 61 so as to empty thereinto. The trough has a clamp 83 on the side thereof which engages the tube 82 so as to hold the tube and the hose in place. The clamp is so arranged that the tube can be detached therefrom in order that the tub may be drained by gravity, if desired at any time, through this hose and tube.

At times, in the filling of the tub with water and washing fluid, air becomes entrapped in and among the clothes so that when the agitator operation is begun, the air becomes freed to escape through the openings in the cover and the water level in the tub falls. To compensate for this, there is provided a reservoir 84 in a tube connection 85 that extends from the water inlet connection 42 on the bottom of the tub, the reservoir being of sufficient capacity to make up such deficiency in the water level. The free end of tube 85 is connected to a suitable source of water supply (not shown). The incoming water will first fill this reservoir 84, and in order to provide the necessary back pressure the tube 85 may be indented or squeezed together slightly, as shown at 86. After the tub is filled, any loss of water level therein will be compensated automatically from the reservoir.

The tub may be suitably supported and housed in a cobinet, and for this purpose the tub may be provided with angle iron ears, or a ring, indicated at 87, and adapted to rest upon or be secured to a ring 88 which is secured to the frame work (not shown) of a supporting structure.

In the operation of the apparatus thus far described, the clothes or textiles to be washed are placed on the interior of the lined tub and the washing chamber is filled with water through the water inlet 42. This is preferably done after the clothes are placed in the tub and the cover 45 is secured in position as shown in Fig. 1; and the soap or washing compound may be put in separately with the clothes or simultaneously with the water. The water level is brought to overflowing or substantially to the top of the cover 45 and above the arched bottom thereof, whereupon the water supply is shut off, either by automatic or manual control. The agitator is set in oscillation, which will set the clothes and water on the interior of the tub in motion so as to thoroughly wash the clothes, as is well understood in this art. As was explained, if for any reason the water level falls as the agitator functions initially, additional water will flow into the tub from the reservoir 84 to restore that level.

During the washing operation, much of the somewhat solid matter which is formed with the soap, soil, lint, etc., floats through the perforations 46 of the cover and into the water in the space above the arched bottom 45 thereof, where it accumulates during the washing operation and does not re-enter the tub because there is no agitation of the water that is in the hollow of the cover.

After the washing operation is completed the oscillation of the agitator is discontinued, and water or other fluid is admitted behind the diaphragm 17 through the inlet connection 43. This water will fill the space between the diaphragm and tub and cause the diaphragm to move inwardly from all sides to contract the washing chamber. Since the water is put in under pressure the clothes will be squeezed upon themselves and against the cover and the agitator, and thereby the wash water will be expelled or extracted from the clothes. As soon as the diaphragm begins to move inwardly in the tub the displaced wash water is forced upwardly through the perforated cover and immediately the contents of the cover is caused to flow over the top of the cover and the ring 53 and into the trough 61. As the squeezing operation continues the water from the interior of the tub continues to flow over the top of the cover into the trough, and is drained away via the drain board 66. At the same time in this squeezing operation water is forced out of the bottom of the tub through the perforations 39 in the base of the agitator, as well as around the edges thereof, and through the drain outlet 41, which water also enters the trough 61 through the hose 81 and the tube 82. Thus, all water and soil matter at the bottom of the tub will be carried away, as well as that at the top of the tub. Since the diaphragm moves inwardly in all directions toward the center of the tub, the clothes are effectively squeezed to force the water therefrom and the flexible diaphragm is able to take whatever contour is necessary to accommodate itself to irregularities in the mass of the clothes for an effective drying operation by squeezing. The diaphragm is also able to fold around the blades of the agitator, so that they do not interfere with the drying.

A part of the first water flowing over the top edge of the cover will first flow into the float chamber 67 thereby providing a water level in that chamber to raise the float 75. That operation will, in turn, open the outlet tube 71 (Fig. 5) which will drain the water from the cover 45, through the perforations 48 and 68 and tube 71. The outlet 77 from this float chamber is made small enough to maintain the float 75 raised for a sufficient length of time after the squeezing operation is completed to permit draining all the water from the cover, after which the opening 77 will be closed. By reason of the annular space 50 between the cover and tub collar it is unnecessary that the holes 48 register with the holes 68 and all water in the space 50 will be drained out, eventually finding its way into the trough 61 and onto the drain board 66. The upper row of perforations 49 in the cover serve to prevent any air locks in the space 50. If provision is made for the holes 43 and 68 to register with each other then the annular space 50 and perforations 49 may be omitted.

After the squeezing or drying operation is completed, water is no longer admitted behind the diaphragm 17 and that which is in the space between the diaphragm and the tub is drained out through the outlet connection 44. As this water is removed, the diaphragm returns automatically to its position against the inner surface of the tub portions 11 and 12. It may happen that the suction on the outlet 44 would allow the diaphragm to seal this opening before all of the water escapes from in back of the diaphragm. To prevent this, a ring 89 of wire, for example, may be secured to the tub so as to extend across the outlet opening 44, which will be sufficient to keep the diaphragm from sealing the outlet and also will provide a channel around the bottom of the tub leading to outlet 44 for the escape of water.

Rinse water is admitted to the interior of the tub through the water inlet connection 42, and again the water level is brought substantially to the top of the tub and above the arched bottom 45 of the cover. When this water level is reached, the supply of rinse water may be cut off and the agitator 33 again set in operation to thoroughly rinse the clothes. During this time, if desired, the rinse water may continue to be supplied to the interior of the tub, but this not necessary, as any remaining floatable solid matter will pass through the holes 46 into the hollow of the cover 45 as above explained. After a predetermined period of rinsing operation, water is again admitted in back of the diaphragm 17 and the squeezing operation is repeated. The rinse water will flow into the trough 61 from both the top and bottom of the tub, and the float valve mechanism will work in the same manner to drain the cover, all as previously described. If desired there may be more than one rinsing operation, but this is not necessary; and it will be understood that all of these operations described above may be automatically controlled or manually operated, as desired.

After the final squeezing operation, the water is drained from in back of the diaphragm 17, which returns to the position shown in Fig. 1, the cover is lifted off of the machine and the clothes are taken out either piece by piece or enmasse and separated afterwards in a clothes basket or on a table.

In the following description of the embodiment of my invention shown in Figs. 7 to 24, insofar as feasible repetition is avoided of the description of certain structural details common to the form in Figs. 1 to 6, for the sake of simplicity.

A tub 101 is provided at the top with a central access opening 102, and around the base of the opening the tub is shaped to provide an external bead 103, an upwardly and outwardly extending conical portion 104, and a horizontal flange 105. The opening is closed by a cover 106 having a peripheral flange 107, a reversely shaped conical portion 108 which fits conical portion 104, and an arched center portion in which are perforations 110. The cover is locked in place by means of channel shaped expansible ring 112, which fits over the flanges 105 and 107. The ring has a suitable clamp and is generally similar in construction and mounting to the ring 53 of Fig. 1.

Most of the interior of the tub is covered with a rubber or other flexible diaphragm or liner 113, the upper end of which is folded around a wire or similar ring 114, arranged to fit in the bead 103, and the lower end of which is folded around a second wire ring 115 adapted to rest upon the bottom of the tub, not far from the axis thereof. It will be noted that when the lid 106 is locked in place its conical portion 108 bears against the covered ring 114 to aid in anchoring the upper end of the diaphragm in its subsequent operation.

At the bottom of the tub is a central opening in which is secured a stuffing box assembly 116, similar to the stuffing box arrangement 22. A clamping plate 117 fits about the upper end of the stuffing box and has a peripheral bead 118 which overlies the lower diaphragm ring 115, the whole assembly being held in place in the tub by the nut 119.

A shaft 121 extends through the stuffing box 116 and into the interior of the tub. The lower end of the shaft is connected to suitable mechanism to oscillate the same about its axis, which mechanism is enclosed in casing 122. This mechanism, forming no part of the present invention, is not shown or described in detail. The lower end of the shaft is recevied in a bearing portion 123 and is recessed to receive a coiled spring 124 and a bearing ball 125. This arrangement permits the vertical displacement of the shaft under pressures on the shaft and associated mechanism during the squeezing operation, as hereinafter described.

Figure 8:
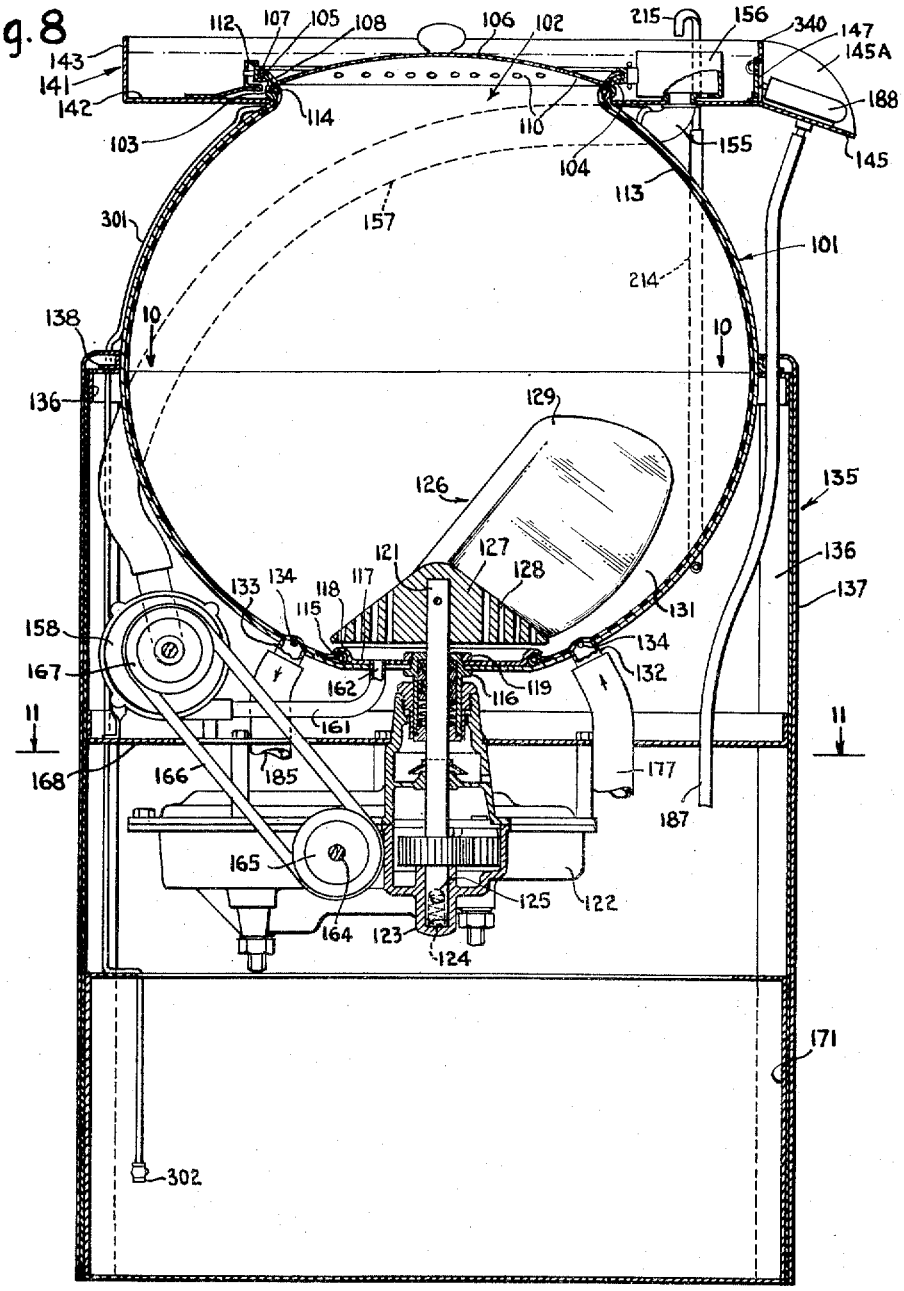
Fig. 8 is a sectional view on lines 8—8 of Fig. 7 with the circulating pump drive added.
Figure 10:
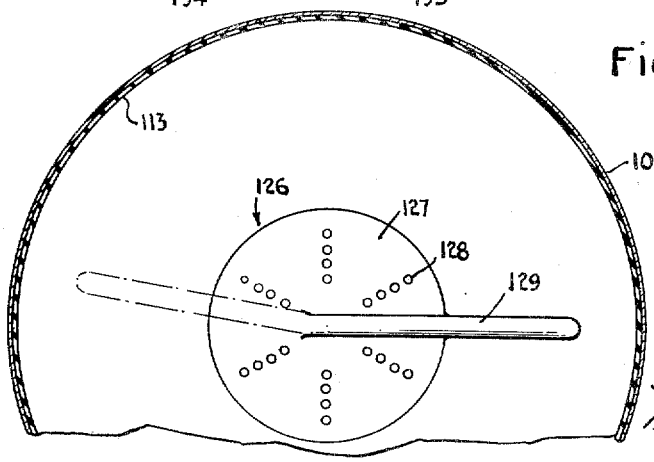
Fig. 10 is a fragmentary horizontal section on lines 10—10 of Fig. 8.
Figure 11:
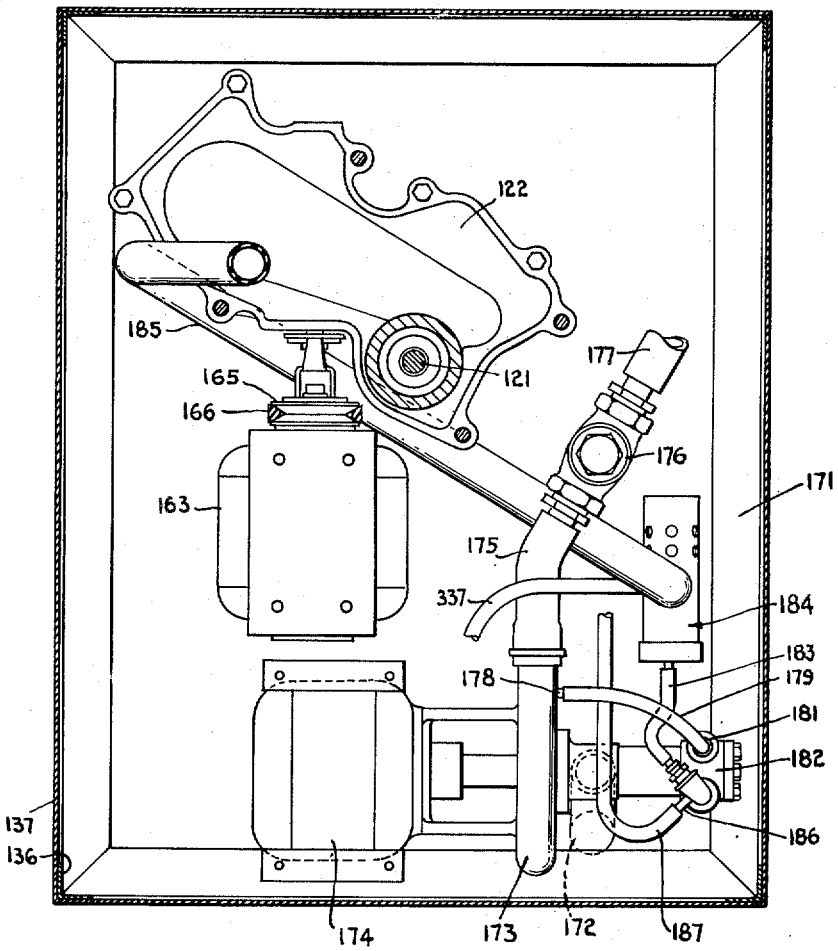
Fig. 11 is a sectional view of the machine on the line 11—11 of Fig. 8, with portions of the transmission and piping broken away.

The upper protruding end of the shaft 121 carries an agitator 126 which may be of any suitable form, for example, such as that shown in Figs. 1 to 6. Or, the agitator may have a somewhat special form, such as shown in Figs. 8 and 10, in which the agitator comprises a conical section 127 with perforations 128 therethrough, and a single blade or fin 129 extending outwardly and upwardly on one side thereof a substantial width and length. As will be observed from Fig. 8, the conical section has a reasonably close running clearance with the top of the bead 118 of clamping plate 117 and that the lower edge of the fin while conforming somewhat to the shape of the tub tapers upwardly and outwardly therefrom to leave the tapering space 131. Thus, as the agitator is oscillated, the limits being indicated in Fig. 10, an upward and outward surge of water is produced and the contents of the tub are agitated and caused to circulate back and forth, upward and over along the sides and top and down in the center of the tub, and also to progress around the tub axis step by step. The tapering space 131 prevents clothes from becoming wedged between the tub and the agitator and, as a matter of fact, there is a constant force ejecting the clothes from that space.

The tub is also provided near its bottommost level with a connection 132, for the admission of water or other fluid behind the diaphragm 113 for the operation thereof in squeezing the clothes, and an outlet connection 133 for the fluid. These connections will be provided with suitable valve mechanisms, to be described later, for the control of the operations. Also, the connections 132 and 133 are in line to be spanned by a wire ring 134 on the interior of the tub, corresponding to the ring 89 of Fig. 1.

The tub 101 and the operating mechanisms are desirably supported in an enclosing cabinet structure 135 comprising a supporting frame work 136 having enclosing side panels 137. The tub 101 has a series of supporting angle iron lugs 138, or other suitable supporting means, adjacent its horizontal center line, and these are secured to the top of the frame work 136. In the illustration, the tub projects above the cabinet structure. It will be understood that the cabinet may be extended to enclose the entire tub and all associated devices, if desired.

Surrounding the tub at its top is a trough 141 which is mounted on the outside of the tub and has its inner edge welded to or otherwise forming a water tight joint with the tub adjacent the junction between the tub and the bead 103. The trough has a bottom 142 and a vertical wall 143 and may be open at its top. At one side the wall 143 is cut away, as at 144, to provide a drain outlet from the trough. A drain board 145 having flanged sides 145A is connected to the trough at this point, this board being of sufficient length to extend beyond the sides of the tub and its cabinet, and permit draining into a sink or stationary tub which will receive the water from the trough 141. Either the trough or the tub will be mounted at a slight angle to drain toward the drain board 145.

The cut away portion 144 is closed by a panel 146 (Figs. 9, 22 and 23) in which is mounted a pivoted gate 147, which is of less height than the panel, to provide continuous protection against water overflowing the trough, except at the drain board connection. The gate is mounted in such a manner that when closed it holds the liquid in the trough 141, but when tilted inwardly at the bottom, in a manner to be described, permits all of the water in the trough to drain out and away.

To control the water level in the tub, and in the trough 141, I provide a float 151 (Fig. 9) mounted on an arm 152 which is pivoted in a bracket 153 mounted on the trough wall 143. The outer end of arm 152 actuates a switch 154 which controls the supply of water to the tub in a manner which will be described. At this point it suffices to say that when water is being admitted to the tub, and the water has run into the trough 141 through the perforations in the lid 106, and risen to the predetermined water level, which may be marked on the inside of the trough, the float 151 will be lifted, the switch 154 closed, and the supply of water shut off through mechanism which will be described.

Also mounted in the trough 141 is a nipple 155 on which is a cup 156. The cup is open at the top and is spaced above the bottom wall of the trough. The bottom of the cup has a central opening 150 to the nipple 155 to which an inlet hose or pipe 157 connects and leads to the intake side of a circulating pump 158.

The bottom of the cup 156 also has a plurality of holes 159 opening into the trough 141.

The outlet side of the circulating pump 158 is connected through a hose or pipe 161 to an inlet 162 to the washing chamber of the tub 101. The circulating pump 158 is driven from a motor 163 (Figs. 7, 8 and 11) through a motor shaft 164, motor shaft pulley 165, belt 166, and circulating pump pulley 167. Motor shaft 164 also drives the transmission, located within housing 122, for oscillating the agitator, but because details of such transmissions are well known, and are not per se a part of this invention, they are not shown or described in detail. The motor, transmission housing and circulating pump may be supported from a frame plate 168 mounted in any suitable manner within the machine cabinet and secured to the frame work 136.

Briefly, a purpose of the circulating pump 158 is to continuously circulate wash and rinse waters through tub 101 during the washing and rinsing operations of the machine; and a purpose of the arrangement of the cup 156 is to serve as a continuous filter for the wash and rinse waters as they are circulated, all of which will be more fully explained, together with the control of the operation.

The actuation of the diaphragm 113 and of the drain control will now be described. In order to drive out the water from the clothes after the washing operation has been concluded, and to dry the clothes after the rinsing operation, fluid, such as water, may be admitted under pressure through the inlet opening 132 behind the diaphragm 113. Since the space behind the diaphragm is sealed in the illustrated construction, admission of water to this space causes the diaphragm to move inwardly all around the tub while remaining anchored at the bottom by ring 115, and at the top by ring 114. This serves to squeeze the clothes, driving the water out of the tub through the perforations 110 in the cover 106 and into the trough 141. Water also will be forced out through the pump connection 161 at the bottom of the tub, the now idle pump 158 and the hose 157 into trough 141.

Diaphragm actuating water may be taken from any suitable source, such as the household water supply. In this construction we take the same from a reservoir tank 171 in the base of the cabinet 135 through an inlet pipe 172 (Figs. 7, 8 and 11) which connects to the intake side of a diaphragm water pump 173, herein illustrated as a large volume, low pressure centrifugal type pump driven by a diaphragm water pump motor 174. Pump 173 is connected to the inlet connection 132 of the tub through a hose or pipe 175, check valve 176, and pipe 177.

The larger proportion of the output of pump 173 is delivered behind the diaphragm 113 to squeeze the clothes. However, a small portion of the pump output is taken off at 178, through a hose or pipe 179, connected to an inlet 181 of a high pressure pump 182. Since the pump 182 may be of any suitable type well known in the art, the details of which are not per se a part of my invention, it is not described in detail.

A portion of the output of the high pressure pump 182 is supplied through a hose or pipe 183 to a hydraulically operated valve 184, to be described, which leads via a pipe 185 to the diaphragm water outlet 133, and thus behind the diaphragm. Additional high pressure water is taken off at 186, fed through a hose or pipe 187 to a plunger actuating mechanism 188 (Figs. 8 and 9) actuating the gate 147. The plunger actuating mechanism operates in response to the water pressure therein to open the gate 147 to permit water to drain from the trough 141 as long as the pressure remains on in the high pressure line. Thus it will be seen that when the machine begins to expel the wash or rinse water by means of the inward displacement of the diaphragm, the gate 147 is opened to permit the dirty water to run out of trough 141 down the drain.

With an understanding of the structure already described, it is now possible to turn to a description of the controls by means of which the full automatic action is obtained to wash, rinse and dry the clothes. I prefer a cycle of wash, flush through a squeezing, rinse, and flush with squeeze dry, and the mechanism will be so described.

Figure 7:
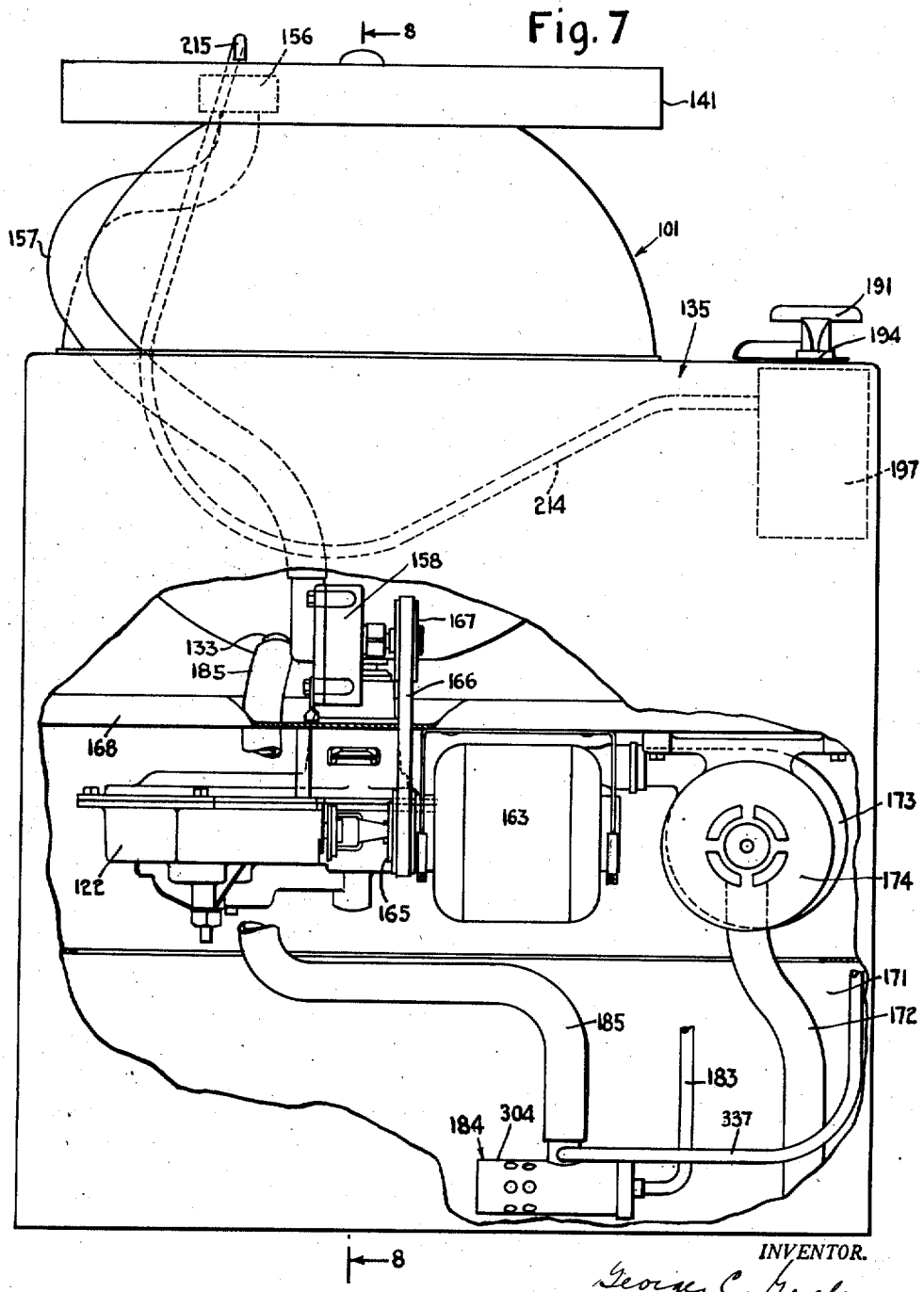
Fig. 7 is a side elevation, partly in section, of a washing machine, in accordance with another, and for some instances, a preferred embodiment of my invention, parts being broken away to facilitate the illustration.
Figure 9:
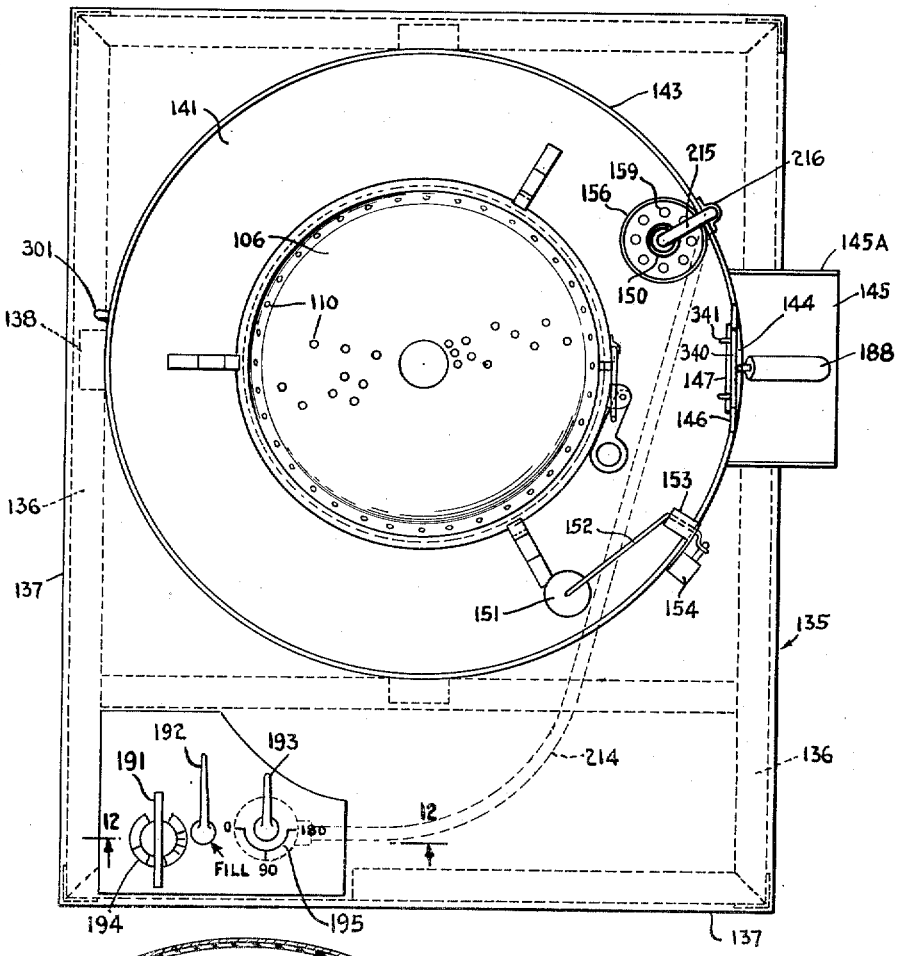
Fig. 9 is a top plan view of the machine shown in Fig. 7.
Figure 12:
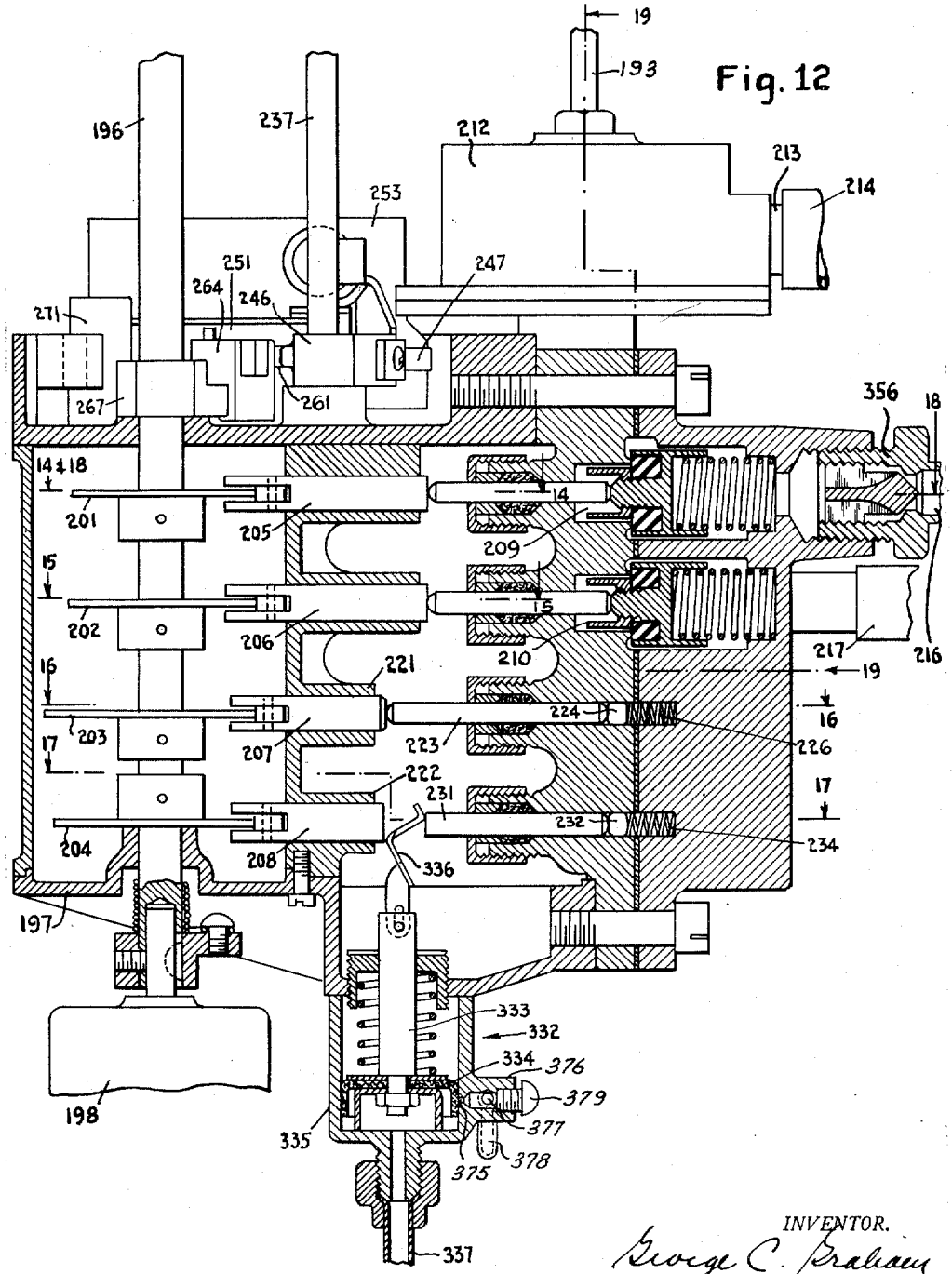
Fig. 12 is a section on lines 12—12 of Fig. 9 showing the control mechanism assembly with parts omitted for clarity of illustration.

Referring to Figs. 7, 9 and 12, three manual controls 191, 192 and 193 are provided on the outside of the cabinet 135. 191 is the time set control, by means of which the operator may set the machine to wash for twenty minutes, fifteen minutes, ten minutes, or any suitable interval for the character of the wash, and this control may be provided with a graduated and indexed dial 194. Lever 192 is the fill lever, which is manually operated to fill the machine with water before initiating the washing action. Lever 193 is the temperature control lever, and serves to regulate the temperature of the water admitted to the machine. It likewise may be provided with an indexed and graduated dial 195.

Referring more particularly now to Fig. 12, the lever 191 is mounted on a shaft 196, which projects into a housing 197 for the control mechanism, and may extend out of said housing to a timer motor 198, which drives the shaft in the automatic operation. The timer motor 198 may be of any suitable and well known type, and the details are therefore not shown or described, it being sufficient for the purposes of this disclosure to state that the timer motor drives the shaft 196 at a predetermined rate, whereby the shaft may carry a plurality of cams, which are set in predetermined relation to each other, to control the various operations of the machine in a timed cycle.

In the present embodiment I have shown four such cams, 201 controlling the hot water inlet to the mixing valve, 202 the cold water inlet to the mixing valve, 203 the agitator motor, and 204 the flushing and drying squeezes.

Each of the cams operates its cam follower 205, 206, 207 and 208, slidably mounted in guides, respectively, within casing 197. Cam followers 205 and 206 respectively operate actuators of valves 209 and 210 which control the admission of hot and cold water respectively to a thermostatically controlled mixing valve 212 (see also Fig. 19), an outlet 213 of which connects with the inlet of the circulating pump 158 as follows (Figs. 7, 8 and 9): a hose or pipe 214 extends from outlet 213 through the top of the cabinet 135 and terminates in a goose neck 215 which is held to the side of the trough 141 by a clamp 216, and the open end of which discharges directly into the inlet opening 150 in the cup 156. This opening constitutes the inlet opening to the circulating pump, and it will be noted that the terminus of the goose neck 215 is above the level of the top of the cup 156 so that there is no possibility of a direct pipe connection effect in this connection. In the manner described, all of the wash and rinse waters enter the tub through the pump 158 and are discharged into the tub beneath the agitator 126, as seen in Fig. 8.

The hot water supply is connected to the control housing 197 through a connection 216, and the cold water supply enters this housing through a connection 217. Adjustment of the lever 193 varies the tension on a thermostatic coil 218 in the mixing valve 212, and simultaneously adjusts the supply from valves 209 and 210 in accordance with setting of the thermostatic coil to provide water as hot or as cold as the individual user chooses for the wash and rinse, that is within the limits of the temperature of the hot and cold water supplies.

Cam followers 207 and 208, which are operated by cams 203 and 204, respectively, are mounted for longitudinal movement in guides 221 and 222 in housing 197 respectively. Follower 207 operates an actuator 223 which, in turn, swings an arm 224, pivoted at 225, against the pressure of a spring 226, and the rocking movement of the arm operates a toggle lever 227 of a switch 228 controlling the circuit to the main motor 163 operating the agitator and circulating pump during washing and rinsing.

Follower 208, operating an actuator 231 in a similar manner, swings an arm 232, pivoted at 233, against the action of a spring 234 to control a toggle lever 235 of a switch 236, to control the circuit of the diaphragm water pump motor 174.

Turning now to the filling operation for putting the wash and rinse waters into the tub, this is controlled by the manual lever 192 mounted on a shaft 237. What occurs when this lever 192 is turned can best be understood with reference to Figs. 13 and 18. The cam followers 205 and 206 are respectively provided with grooves, like groove 238, and the shaft 237 carries a pair of fingers, like finger 241, respectively engaging in these grooves, the guides for the followers being slotted for this purpose. Thus, as the lever 192 is turned counterclockwise, the valves 209 and 210 are opened to admit hot and cold water to the temperature regulating valve 212 and from thence into the tub, as already described. The tub will fill with water notwithstanding that the circulating pump 158 is not operating, all connections to the tub inlet 162 being open.

Figure 13:
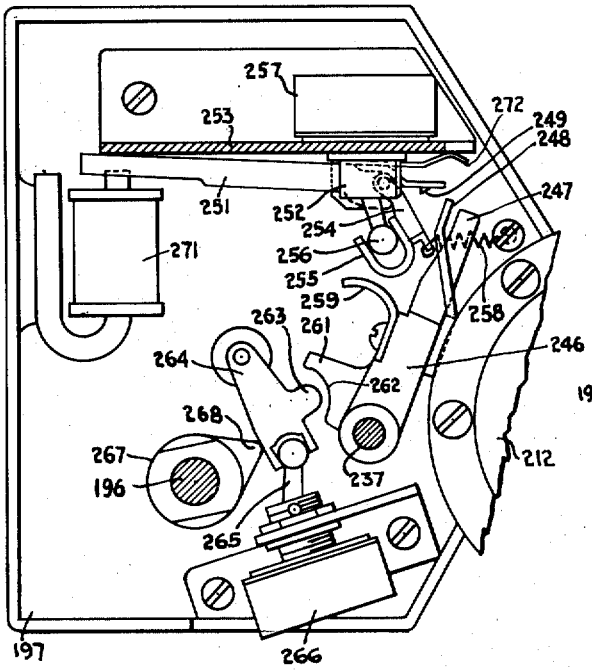
Fig. 13 is a fragmentary plan view of the mechanism of Fig. 12.
Figure 14:
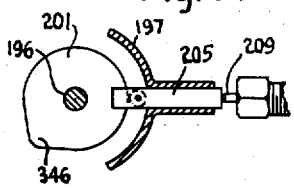
Fig. 14 is a section on lines 14—14 of Fig. 12.
Figure 15:
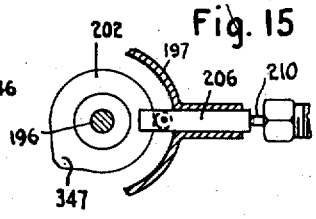
Fig. 15 is a section on lines 15—15 of Fig. 12.
Figure 16:
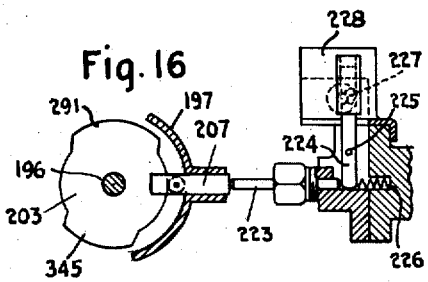
Fig. 16 is a section on lines 16—16 of Fig. 12.
Figure 17:
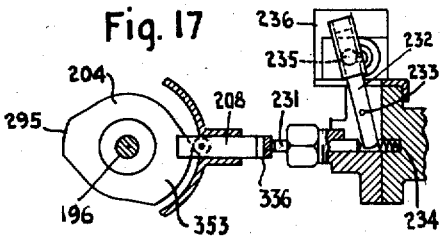
Fig. 17 is a section on lines 17—17 of Fig. 12.

Referring now to Fig. 13, the shaft 237 also has fastened thereto an arm 246 which has a reduced outer end 247 and on which is mounted a U-shaped spring latch member 248, the end of which projects slightly beyond the end of the arm 246. As the shaft 237 is turned counterclockwise to open the water valves, the turning movement is continued until the end of the latch member 248 slips behind a catch 249, which is near the outer end of a pivoted lever 251, this arrangement holding the lever and valves in the filling position. The subsequent release of the latch will be described.

The pivot for the lever 251 is in a frame 252 that is mounted on a plate 253. Also pivoted in this frame is an auxiliary lever 254 which carries a U-shaped holder 255 in which is loosely received the end of a toggle lever 256 of a switch 257 located in circuit with the agitator and circulating pump motor. The end of the auxiliary lever 254 engages the reduced end 247 of arm 246 and has secured thereto one end of a spring 258, the other end of which is connected to a suitable place on the control mechanism casing 197. The arm 246 also has thereon a curved striker 259 which, at one point in the functioning of the mechanism, strikes the holder 255.

At the end of the arm 246 nearest the shaft 237 is a projecting pusher 261 having a curved cam surface 262 adapted to engage the lobe 263 on the side of a pivoted yoke 264. The outer end of this yoke straddles the end of toggle lever 265 of main line switch 266. The timer motor shaft 196 carries a cam 267 having a single lobe 268 located so as to engage the yoke 264 on the opposite side from the pusher 261.

Figure 24:
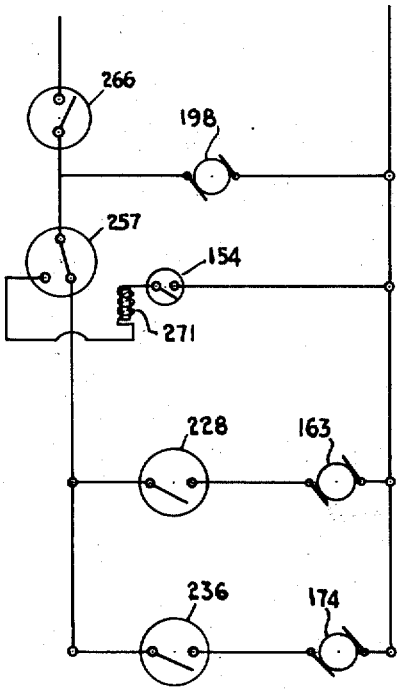
Fig. 24 (see sheet No. 9) is a wiring diagram of the machine of Figs. 7 to 23.

To understand the electrical circuits, and the release of the filling lever, reference may be had to Fig. 24. To start the machine, the operator first adjusts the control lever 191 to the desired time for the washing cycle indicated on dial 194. In doing this, the cam 267 is turned so that the lobe 268 is not in engagement with the yoke 264. The turning action also moves the other cams on the same shaft so that lobe 291 on cam 203 closes its associated switch 228. Next, the operator turns the fill lever counterclockwise until the latch 248 engages behind the catch 249, which action opens the filling valves 209 and 210, as above described. The consequent rotation of the shaft 237 has turned the arm 246 which, through the pusher 261 and yoke 264 closes the circuit through the main line switch 266. However, immediately before the closing of this circuit, the upper end of the arm 246, through engagement with the auxiliary lever 254, has operated the switch 257 to open the circuit to the agitator motor 163. The circuit to the drier pump motor 174 is already open through the switch 236 under the control of its associated cam, as will be described.

In this position of the control mechanism, the tub will be filled with wash water until the entire tub is full and water has overflowed the top into the trough 141. As the water fills this trough, float 151 will be lifted until the switch 154 is actuated to close the circuit to an electromagnet 271 that is associated with the end of latching lever 251. Energization of the electromagnet 271 will move lever 251, against the action of a spring 272, to swing the catch 249 out of the way and allow the spring 258 to pull the auxiliary lever 254 and arm 246 in the opposite direction. This action, aided by the striker 259, operates the switch lever 256 in the direction to now close the circuit to the agitator and circulating pump motor 163, to permit the operation thereof upon the closing of switch 228. This same releasing of the catch 249 and the associated shaft 237 now permits the hot and cold water valves 209 and 210 to close to shut off the supply of water to the tub. The main line switch 266 is not affected by this releasing action and remains in the closed circuit position. At the finish of the complete cycle, as will be described, the cam 267 will move the yoke 264 to operate the switch 266 in the opposite direction to open the main circuit.

The machine will now operate for the selected washing time to agitate the clothes and to continuously circulate water through the tub as above described. In connection with the water circulation, it should be noted that the wash water is being continuously filtered with consequent advantages in the washing operation. This filtering is brought about by reason of the arrangement of parts. The water discharged from the pump 158 passes through the tub, out through the openings 110 in the cover 106, and overflows into the trough 141. As the washing proceeds, soil freed from the clothes is forced out into the trough, and much of this soil accumulates and floats on the water in the trough. The heavier particles settle to the bottom of the trough. The top of the cup 156 is above the water level maintained in the trough, and the bottom of the cup is spaced above the bottom of the trough. Water in the trough enters the cup 156 through the openings 159 and passes into the inlet opening 150 leading to the circulating pump 158. Thus, neither the floating nor the solid soil recirculates in the tub during the washing, or the rinsing, action. Not only does this improve and speed the washing action, but it also can be translated in to a reduction in the required quantities of water and hence permits a smaller tub and cabinet with corresponding economies in the manufacture and costs of operation of the machine.

After the completion of the washing operation, the tub is desirably drained of wash water in a manner that produces a "flushing" action to first remove the floatable soil matter before it can come in contact with the clothes. According to this construction, this action is accomplished by causing the diaphragm to move inwardly to contract the washing chamber, thus displacing the water in the tub, forcing a large part of it out through the openings 110 in the cover 106. This displaced water will overflow into the trough 141 and out through the already opened gate 147 in the trough, to be discharged to the drain. Both because of this and because simultaneously with the operation of the diaphragm the gate 147 was opened, all soil matter collected in the trough from the washing will be immediately discharged to the drain and cannot re-enter the tub. At the same time as the water is displaced upwardly through the perforated lid, the same action will force water out through the bottom connection 162 and pipe 161 between the circulating pump 158 and the tub, through this pump (which is of the centrifugal type) and upwardly through the pipe 157 to be discharged into the trough through the cup 156. The operation of the diaphragm and of the gate will now be described.

During the washing cycle, the timer motor 198 causes a lobe 291 of cam 203, to pass the follower 207, and the pivoted arm 224 actuates the switch 228 to interrupt the circuit to the agitator and circulating pump motor, stopping the action thereof. The same operation of the shaft also causes a lobe 295 of the cam 204, through follower 208 and the pivoted arm 232, to actuate the switch 236 to complete the circuit to the motor 174 for the diaphragm water pumps 173 and 182. Pump 182, through the connection 187 and plunger 188, immediately moves the gate 147 inwardly to begin draining the water, etc., from the trough 141. The construction of the gate and the closing action thereof will be described.

Centrifugal pump 173 delivers substantial quantities of water from the reservoir 171 to the pressure space behind the diaphragm 113 to move the same inwardly in all directions to displace the water in the washing chamber and to squeeze the clothes. At this point is should be noted that I have provided an air vent for the space behind the diaphragm, through the medium of a small tube 301 (Fig. 8) which opens at one end into the space immediately below the upper diaphragm ring 114 and, at the other end, into the reservoir 171. A valve 302 may be connected to this tube at the lower end thereof, which valve may be of any suitable construction and may be of a type to be adjustable to regulate the maximum pressure in the space behind the diaphragm and, therefore, the maximum squeezing pressure on the clothes. It will be evident that as water enters the pressure space behind the diaphragm any air in that space will be forced out through the tube 301 and will escape through the open top of the reservoir 171.

Figure 21:
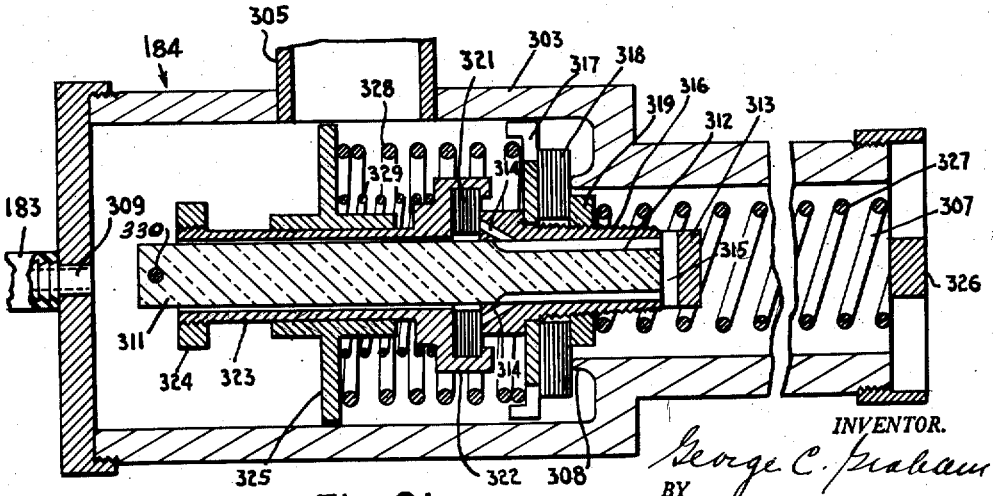
Fig. 21 is a central section of a diaphragm control or dump valve.
Figure 22:
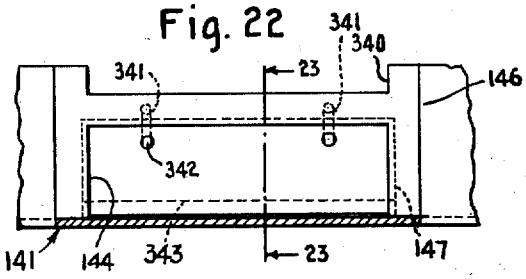
Fig. 22 is a fragmentary detail of the trough drain gate.
Figure 23:
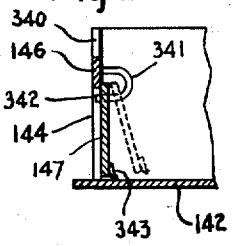
Fig. 23 is a section on the lines 23—23 of Fig. 22.

The high pressure pump 182 has a small capacity and, as explained, is connected to the pressure space through the valve 184, the construction of which is illustrated in Fig. 21. See also Fig. 7. This valve also may serve as the dump valve controlling the release of the water from behind the diaphragm and its return to the reservoir. The valve mechanism comprises a casing 303 within an enclosing housing 304, the casing having an opening 305 receiving the hose 185 which extends to the outlet connection 133 in the tub which communicates with the pressure space. The valve casing also has a main discharge opening 307, a valve seat 308, and an opening 309 to which the tube 183 from the high pressure pump is connected. A valve stem 311 is centrally mounted in the casing and at its lower end is provided with a plurality of flat sides 312 which are enclosed by a sleeve cap 313. At the upper end this sleeve has passages 314 respectively communicating with the spaces between the sleeve and the flattened sides of the stem, and the lower or cap portion has a transverse discharge passage 315 therefrom and communicating with the main discharge outlet 307, this construction constituting what is hereinafter termed the bleeder valve. The sleeve cap 313 has a reduced portion 316 which is externally screw threaded. A guiding spider 317 and a valve closure disc 318 are received on this reduced portion and are held in place thereon by means of nut 319.

The top of the sleeve cap 313 constitutes the valve seat for the passages 314, and these are closed by a disc 321 mounted in a cup 322, carried by a second sleeve 323 which is also loosely mounted on the stem 311. At the upper end, the second sleeve has a stop nut 324. Between the stop nut and the cup 322, the second sleeve is surrounded by a plate 325 having a hub portion slidable on this sleeve. A spider 326 is mounted at the main discharge opening and constitutes support for one end of a coiled spring 327, the other end of which bears against nut 319 and tends to move the disc 318 away from its seat. A second spring 328 extends between the guiding spider 317 and the plate 325 and tends to separate these. A third and lighter spring 329 extends between the plate 325 and the cup 322, tending to separate these.

When high pressure water is admitted to the valve casing through the opening 309, it exerts pressure against the plate 325, pushing the same inwardly and through the second spring 328 and the guiding spider 317 closes the main valve 318 against the action of the spring 327; and the further movement of the plate 325 in the same direction closes the smaller or bleeder valve 314. Thus, no water will return to the reservoir from the pressure space behind the diaphragm. At the same time it will be noted that the high pressure water has moved the plate 325 far enough to partially uncover the opening 305 which connects with the pressure space, so that the high pressure fluid can enter behind the diaphragm. When the pressure capacity of the centrifugal pump 173 is reached, the smaller pump 182 will continue to supply water to the pressure space and to increase the pressure therein, according to the length of time of operation (up to the capacity of the pump).

When, through operation of the timer motor, lobe 295 of cam 204 passes the follower 208, spring 234 will swing arm 232 on its pivot in the opposite direction to actuate switch 236 to again open the circuit to the water pump motor 174, thus discontinuing the squeeze operation.

As soon as this occurs, the water pressure is removed from the plate 325 in the diaphragm valve casing 303, and spring 328 will move the plate outwardly to strike the stop nut 324, which action will open positively the bleeder valve 314 by moving the sleeve 323 outwardly until the nut 324 engages pin 330. As will be seen, this bleeder valve is now open to the hose connection 185 from the tub so that the pressure in the space behind the diaphragm becomes reduced as the water bleeds off. After a predetermined time the pressure will be reduced sufficiently for the spring 327 to open the main valve at 308 to quickly dump the diaphragm operating water back into the reservoir 171.

The control unit, as illustrated in Fig. 12, includes a safety trip as protection against excess pressures being developed in the machine during the squeeze operation. This device is indicated generally at 332 and comprises a plunger 333 having a spring pressed head 334 operating in a housing 335. Pivoted to the upper end of plunger 333 is a somewhat S-shaped link 336 which, in the position shown, constitutes part of the mechanical linkage between the follower 208 and the arm 232 of the diaphragm pump motor switch 236. A hose or tube 337 extends from the housing 335 to the diaphragm valve casting 303 at its opening 305 (see Figs. 7 and 21) where it will be subject at all times to pressure in the space behind the diaphragm 113. If for any reason, pressure develops in the tub above that for which the safety trip is set, the plunger 333 will be moved upwardly, in Fig. 12, to move the link 336 upwardly and thus permit the spring 234 to swing arm 232 to open the circuit to switch 236 to stop the operation of the pumps 173 and 182. After the excess pressure is relieved and the lobes of the cam 204 have passed the follower 208, the safety trip is reset by downward movement of the spring-pressed head 334 for the subsequent operations. The relieving of the excess pressure is performed by a bleeder hole 375 in housing 335 communicating through extension 376 and aperture 377 to drain pipe 378 which leads to reservoir 171, said bleeder hole being opened instantaneously when head 334 moves upward by the action of plunger 333, as described. A plug screw 379 is provided to close off extension 376.

To understand the functioning of gate 147, reference will be had to Figs. 7, 8, 22 and 23. It will be noted that gate 147 is of less height than the trough 141 and is mounted below a cut out 340 in panel 146 so that at all times the machine is protected against overflowing of the trough except over the gate which is opposite the drain board 145. Gate 147 is loosely mounted on a pair of loops 341 which are arranged with a horizontal bottom portion 342 that permits the gate to move inwardly away from the opening in the panel under the action of the plunger 188 connected to the high pressure pump, as above described. This inward movement is continued until the gate reaches the curved part of the mounting loops so that then the gate tilts to the dotted line position shown in Fig. 23 to open the gate at the bottom to permit complete draining of the trough 141.

After the squeezing operation is completed, and the diaphragm water pumps are shut off, plunger 188 retracts because there is no longer pressure applied from the high pressure pump, whereupon the gate 147 swings to the vertical position without sliding toward opening 144 on the horizontal portions 342 of the loops 341, whereby the gate opening is not completely closed. In this connection, gate 147 is provided with a gasket 343 which engages the bottom of the trough when the gate is in full closed position, against panel 146. The gate is slid into the full closed position when the tub is again filled with water which overflows into and fills the trouth to the predetermined water level as described above.

In connection with the description thus far of the cycle of operation through the first squeezing operation, the draining, and the dumping of the pressure water from behind the diaphragm to the reservoir, it will be noted from Figs. 13 to 17 and 24 that, after the manual filling operation, the cams 201 and 202 have not opened the associated valves; that lobe 291 of cam 203 has maintained the agitator and circulating pump motor 163 operating throughout the selected washing time; and that, as the cam lobe 295 of cam 204 was about to begin operation of the diaphragm water pump motor 174, the cam lobe 291 of cam 203 passed its follower, thus opening the circuit through switch 228 for the agitator and circulating pump motor. This motor remains out of action during the flexing in and out of the diaphragm 113 in the squeezing operation. It will further be noted that lobe 295 is shorter in peripheral length than the other lobe (to be described) on this cam 204, the reason being that it is contemplated that the pressure exerted by the diaphragm following the washing operation will be materially less than the pressure exerted during the drying operation, also to be described. This condition comes about, as explained above, by reason of the fact that the squeeze pressure is governed to some extent by the length of time the high pressure pump is functioning, if at all, after the pressure of the centrifugal pump 173 has been attained. As the cam lobe 295 of cam 204 passes its follower the diaphragm water pump motor 174 is stopped by the reopening of the circuit through switch 236, and a lobe 345 of cam 203 now reenergizes the motor for the agitator and circulating pump through closing of the circuits through switch 228. As to this, lobe 345 is effective to maintain the agitator and circulating pump operating during the second or rinse period.

Figure 18:
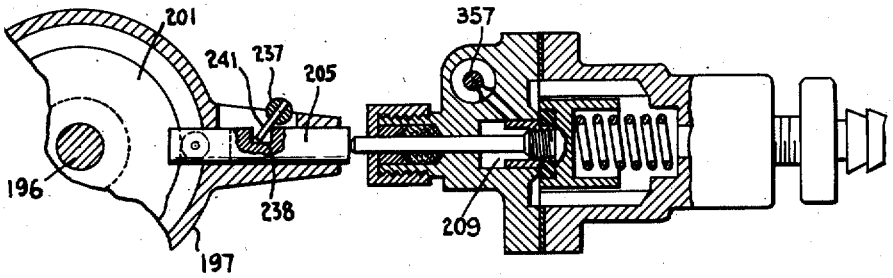
Fig. 18 (see sheet No. 11) is a partial sectional view on the lines 18—18 of Fig. 12.

The filling of the tub with rinse water is substantially the same operation as the filling with wash water except that instead of the opening of the water valves by manual operation of the lever 192 (see Fig. 9) and its shaft 237 (see Figs. 13 and 18), lobes 346 and 347 of cams 201 and 202, respectively, now open the valves 209 and 210 through movement of the associated followers 205 and 206. Referring to Figs. 13 and 18, as these followers move to the right, the shaft 237 is turned on its axis until latch 248 of arm 246 slips behind catch 249, as described above. The cam lobes 346 and 347 pass their associated followers, but the filling valves are maintained open until float 151 again actuates the switch 154 to energize electromagnet 271 to release the catch and permit the valves 209 and 210 to close, all as above described. This movement of the shaft 237 again closes switch 257 to establish the supply circuit at the time the cam lobe 345 has actuated switch 228 to start the operation of the agitator and the circulating pump for the duration of the rinse period. I have found that thorough rinsing of the clothes can be accomplished in less time than the full washing period, and hence lobe 345 is shorter in peripheral length than lobe 291 on cam 203.

At conclusion of the rinse cycle, lobe 345 passes its associated follower at the time that a lobe 353 on cam 204 again actuates its follower 208 to reenergize the diaphragm water pump motor 174 to repeat the diaphragm operation to expel the water from the tub and to open the gate 147 to drain the trough, all as described above in connection with the first diaphragm operations, except that here the lobe 353 is peripherally longer than lobe 295 and hence the high pressure pump 182 will be effective to increase the pressure behind the diaphragm and upon the clothes in the washing chamber. This pressure can be whatever may be considered suitable for the degree of drying of the clothes desired.

As the cam shaft 196 rotates the several cams as described, cam 267 (Figs. 12 and 13) has been rotating, and when the drying operation is completed lobe 268 of this cam has pushed yoke 264 to the right (Fig. 13) to actuate main switch 266 to open the main line circuit and stop operation of the entire machine, whereupon the lid 106 may be removed and the washed, rinsed and dried clothes taken out of the washing chamber.

In connection with the control unit (Fig. 12) provision is made for adjusting the rate of flow of incoming water, as may be desired in some localities. This is done by means of a manually adjustable valve 356, as is well understood in this art and hence needs no further description.

Figure 20:
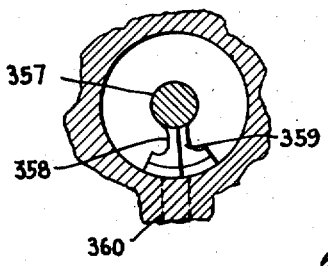
Fig. 20 is a fragmentary sectional view on the lines 20—20 of Fig. 19.
Figure 19:
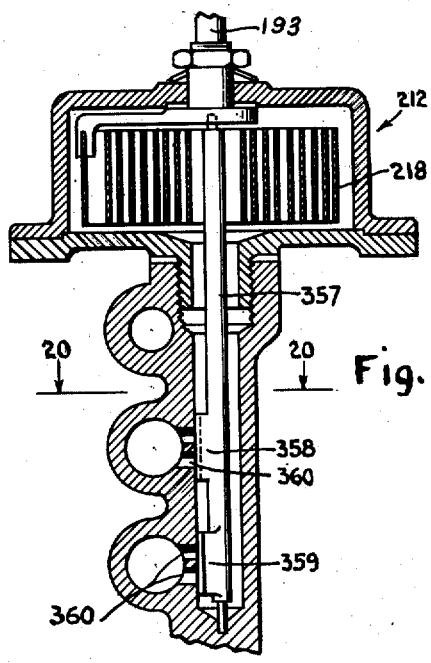
Fig. 19 is a partial sectional view on the lines 19—19 of Fig. 12.

The adjustment of the flow of the hot and cold water by the thermostatic coil 218 will be understood from Figs. 19 and 20. One end of coil 218 is adjustably secured to the housing of the mixing valve 212, and the other end thereof is secured to a depending shaft 357.

This shaft carries a pair of auxiliary valve elements 358 and 359 communicating with the hot and cold water valves 209 and 210. One of these auxiliary valves is seen in enlarged detail in Fig. 20, wherein movement of the shaft 357 turns the valve element 358 to open more or less the ports 360 connecting this auxiliary valve and the associated supply valve. This mechanism is duplicated for the other supply valve, and it is believed unnecessary to repeat the description thereof.

Figure 25:
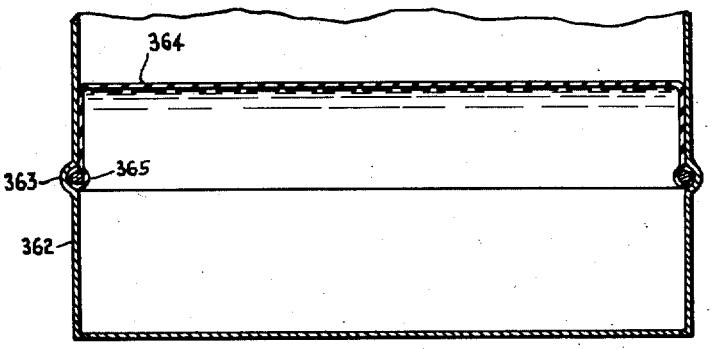
Fig. 25 is a sectional view of an alternate form of water reservoir.

Referring now to the alternate form of reservoir shown in Fig. 25, provision is made for enclosing this tank so as to prevent evaporation and contamination of the contained water in situations where it is found that these conditions might occur. In this case, the reservoir tank 362 has a circumferential groove 363 intermediate its top and bottom and the tank is closed at its top by a flexible diaphragm 364, the periphery of which is secured to an expansible ring 365 which is received in the groove 363. It is believed unnecessary to illustrate the various pipe connections into and out of this tank, which are similar to those connections explained in connection with the machine of Figs. 7 to 11, except that they will be made through the sides of the tank below the diaphragm 364, and the air vent, such as the one illustrated at 301 in Fig. 8, need not terminate within the reservoir. It will be understood that as the water is withdrawn from the reservoir and returned thereto the diaphragm 364 will substantially follow the water level therein.

In the specification, I have explained the principles of my invention and the best modes in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the function and scope thereof, as will be clear to those skilled in the art.

I claim:

1. In washing apparatus, a tub having a clothes receiving chamber and an open top, a drain trough surrounding said top, a drain at the bottom of said tub, a tubular connection therefrom to said trough, means for adjusting the height of said connection with respect to said trough, clothes and water agitating means mounted for operation in said chamber, means for supplying water to said tub, and means for exhausting water from said chamber through both the top of said tub and said bottom drain.

2. In washing apparatus, a tub having a clothes receiving chamber and an open top, a drain trough surrounding said top, a drain at the bottom of said tub, a connection therefrom to said trough, clothes and water agitating means mounted for operation in said chamber, means for supplying water to said tub, a flexible diaphragm mounted in said tub in a position normally clear of said open top and said drain, and means for operating said diaphragm to remove the water from said chamber through the top of said tub and said drain.

3. In washing apparatus, a tub having a clothes receiving chamber and an open top, the bottom of said tub having a drain outlet, a flexible diaphragm fitting about the sides of said chamber and extending from adjacent said outlet to adjacent said top, the tub having a groove adjacent said top, a ring about which the upper end of the diaphragm is secured, the ring fitting into said groove, a second ring at the lower end of the diaphragm, detachable clamping means retaining the second ring and diaphragm in place, the second ring and diaphragm leaving the drain outlet open to the interior of said chamber, and means including fluid connections to said tub in back of said diaphragm, for operating said diaphragm to exhaust water from the interior of said chamber through said outlet and said top.

4. In washing apparatus, a tub having a clothes receiving chamber and an open top, said tub having a groove adjacent said top, a flexible diaphragm fitting about the sides of said chamber, a ring arranged to be received in said groove, an end of said diaphragm fitting about said ring and terminating with a portion between the diaphragm and the tub, a second ring arranged to be mounted at the bottom of said chamber, and means including fluid connections to said tub in back of said diaphragm for operating said diaphragm.

5. In washing apparatus, a tub having a clothes receiving chamber and an open top, the bottom of said tub having a drain outlet, a flexible diaphragm fitting about the sides of said chamber and extending from adjacent said outlet to adjacent said top, the tub having a groove adjacent said top, a ring about which the upper end of the diaphragm is secured, the ring fitting into said groove, a second ring about which the lower end of the diaphragm is secured, clamping means retaining the second ring and diaphragm in place, the second ring and diaphragm leaving the drain outlet open to the interior of said chamber, means including fluid connections to said tub in back of said diaphragm for operating said diaphragm to exhaust water from the interior of said chamber through said outlet and said top, an agitator comprising a disc and radial blades and arranged to operate in said chamber near the bottom thereof, an oscillatable shaft extending through the bottom of the tub on the upper end of which the agitator is mounted, a stuffing box mounted in the bottom of the tub and through which the shaft extends, the upper end of the stuffing box being screw threaded, the clamping means fitting over the end of the box, and a nut engaging the clamping means and also securing the stuffing box in place in said tub.

6. In washing apparatus, a tub having a clothes receiving chamber, a flexible diaphragm fitting about the sides of the tub, a ring about which the lower end of said diaphragm is secured, an agitator arranged to operate in said tub near the bottom thereof, an oscillatable shaft extending through the bottom of the tub on the upper end of which the agitator is mounted, a stuffing box assembly having a shoulder beneath the tub bottom and having an upper screw-threaded portion, the latter extending into said chamber, a clamping plate fitting upon said portion extending into said chamber, and being arranged to engage the ring mounted end of said diaphragm, a nut fitting upon the screw-threaded end and retaining the clamping plate in position as well as drawing the shoulder and tub bottom in water tight connection, water inlet and drain connections to said tub communicating with the interior of said chamber through said clamping plate, and fluid connections to said tub in back of said diaphragm to admit and discharge fluid for operating the diaphragm.

7. In washing apparatus, a tub, a flexible diaphragm mounted in the tub and normally resting against an interior wall thereof, the tub having an opening in back of said diaphragm, a fluid connection communicating with said opening, and a hinged flap between the diaphragm and the tub for closing the opening.

8. In a washing apparatus, a tub, a flexible diaphragm mounted therein, means for expanding the diaphragm in the tub, agitating means on the interior of the tub and subject to pressure when the diaphragm is expanded, a shaft extending into the tub and on which the agitating means is secured, a stuffing box mounting for said shaft, and means permitting the mounting for the agitating means to temporarily move vertically under pressure on said agitating means occasioned by expansion of the diaphragm.

9. In washing apparatus, a tub, a flexible diaphragm mounted in the tub and normally resting against an interior wall thereof, the tub having a fluid inlet to the rear of said diaphragm, means for supplying fluid under pressure through said inlet, and a cover closing said inlet and mounted so as to be moved inwardly against the diaphragm by the pressure of the incoming water.

10. In a washing machine, a tub, a flexible liner in the form of a sleeve open at its top and bottom and secured at said top and bottom circumferentially around said tub at substantially the top and bottom thereof and forming a washing chamber, said tub being provided with fluid inlet and outlet openings communicating with said washing chamber, and said tub being provided behind said sleeve with a fluid inlet and a fluid outlet, a circulating pump having an inlet and an outlet, a connection to the inlet of said pump from said tub, and a connection from the outlet of said pump to said washing chamber.

11. In a washing machine, a tub, a flexible liner in the form of a sleeve open at its top and bottom and secured at said top and bottom circumferentially around said tub at substantially the top and bottom thereof with a water tight connection, said liner forming a washing chamber, said tub being provided with fluid inlet and outlet openings communicating with said washing chamber, and said tub being provided behind said sleeve with a fluid inlet and a fluid outlet, a circulating pump having an inlet and an outlet, an overflow chamber associated with said tub and receiving water therefrom when the water reaches a predetermined level, a connection from said overflow chamber to the inlet of said pump, and a connection from the outlet of said pump to said washing chamber.

12. In a washing machine, a tub, a flexible liner in the form of a sleeve open at its top and bottom and secured at said top and bottom circumferentially around said tub at substantially the top and bottom thereof with a water tight connection, said liner forming a washing chamber, said tub being provided with fluid inlet and outlet openings communicating with said washing chamber, and said tub being provided behind said sleeve with a fluid inlet and a fluid outlet, a circulating pump having an inlet and an outlet, an overflow chamber positioned to receive water overflowing from said tub, a water delivery connection from said overflow chamber to the inlet of said pump, and a water delivery connection from the outlet of said pump to said washing chamber.

13. In a washing machine, a tub, a flexible liner in the form of a sleeve open at its top and bottom and secured at said top and bottom circumferentially around said tub at substantially the top and bottom thereof with a water tight connection, said sleeve defining a washing chamber within said tub and a pressure chamber between said sleeve and said tub, fluid inlet and outlet connections to said washing chamber and said pressure chamber, a chamber positioned to receive overflow water from said washing chamber, a circulating pump having an inlet and an outlet, a water delivery connection from said overflow water chamber to the inlet of said pump, and a water delivery connection from the outlet of said pump to said washing chamber.

14. In a washing machine, a tub, a flexible liner in the form of a sleeve open at its top and bottom and secured at said top and bottom circumferentially around said tub at substantially the top and bottom thereof with a water tight connection, said sleeve defining a washing chamber within said tub and a pressure chamber between said sleeve and said tub, fluid inlet and outlet connections to said pressure chamber, the upper part of said tub having a drain outlet communicating with said washing chamber, a chamber positioned to receive overflow water from said washing chamber, a circulating pump having an inlet and an outlet, a water delivery connection from said overflow water chamber to the inlet of said circulating pump, a water delivery connection from the outlet of said pump to said washing chamber, and a movable agitator positioned within said washing chamber centrally of the bottom thereof.

15. In a washing machine, a tub, a flexible liner in the form of a sleeve open at its top and bottom and secured at said top and bottom circumferentially around said tub at substantially the top and bottom thereof with a water tight connection, said sleeve defining a washing chamber within said tub and a pressure chamber between said sleeve and said tub, fluid inlet and outlet connections to said washing chamber and said pressure chamber, a chamber positioned to receive overflow water from said washing chamber, a circulating pump having an inlet and an outlet, a water delivery connection from said overflow water chamber to the inlet of said circulating pump, a water delivery connection from the outlet of said circulating pump to said washing chamber, and a movable agitator positioned within said washing chamber centrally of the bottom thereof, said agitator comprising a perforated body portion and an upwardly extending fin.

16. A washing machine as defined in claim 15 wherein said water delivery connection from the outlet side of said pump is positioned under the perforated portion of said agitator.

17. In a washing machine, a tub, a flexible liner in the form of a sleeve open at its top and bottom and secured at said top and bottom circumferentially around said tub at substantially the top and bottom thereof with a water tight connection, said sleeve defining a washing chamber within said tub and a pressure chamber between said sleeve and said tub, a first chamber arranged to receive overflow water from said washing chamber, a second chamber associated with said first chamber and receiving water therefrom, the path of water flow between said first and second chambers being such as to impede the flow of water-borne dirt into said second chamber, a circulating pump having an inlet and an outlet, a water delivery connection from said second chamber to the inlet of said pump, and a water delivery connection from the outlet of said pump to said washing chamber.

18. In a washing machine, a tub, a flexible container supported by said tub and defining a washing, rinsing and drying chamber, agitating means movable independently of said container for agitating clothes and water so as to wash the clothes, said tub being provided with a wash water outlet positioned above the center of said chamber, a drain connected to said outlet, means for admitting water to the chamber for washing and rinsing the clothes, and said tub being provided behind said container with a fluid inlet and a fluid outlet.

19. In a washing machine, a tub, a flexible container having its upper edge rigidly supported by said tub, said container defining a washing, rinsing and drying chamber and being arranged so that the sides of the container move inwardly toward each other to squeeze the clothes contained therein, said tub being provided with a wash water outlet positioned above the center of said chamber, means operable within the chamber for agitating clothes and wash water to wash clothes in said container, and said tub being provided behind said container with a fluid inlet and a fluid outlet.

20. In a washing machine, a supporting tub, a flexible container having its top secured circumferentially adjacent the top of said tub and depending therebelow, the walls of said container defining a washing, rinsing and drying chamber and being free to move inwardly to squeeze clothes contained therein, said tub being provided with a wash water outlet positioned above the center of said chamber, motor driven means operable within the container for agitating clothes and water to wash clothes in said chamber, and means for applying pressure to the outside of said container to squeeze the clothes therein and expel water therefrom.

21. In a washing machine, in combination, a tub, a flexible liner secured to said tub circumferentially adjacent the top thereof and adjacent the bottom thereof and defining a washing and drying chamber in said tub, a movable agitator mounted in said washing and drying chamber, said tub being provided with fluid inlet and outlet openings communicating with said washing and drying chamber, and said tub being provided behind said liner with a fluid inlet and a fluid outlet.

22. In a washing machine, in combination, a tub, a flexible liner secured to said tub circumferentially adjacent the top thereof and adjacent the bottom thereof and defining a washing and drying chamber in said tub, an oscillatory shaft, an agitator in said washing and drying chamber and mounted on said shaft, said tub being provided with fluid inlet and outlet openings communicating with said washing and drying chamber, and said tub being provided behind said liner with a fluid inlet and a fluid outlet.

23. In a washing machine, in combination, a tub, a flexible liner secured to said tub circumferentially adjacent the top and bottom thereof, and defining a washing and drying chamber in said tub, an oscillatory agitator mounted near the bottom of said washing and drying chamber, said tub being provided with fluid inlet and outlet openings communicating with said washing and drying chamber, and said tub being provided behind said liner with a fluid inlet and a fluid outlet, at least one of the openings from the washing and drying chamber being above the center of the tub.

24. In a washing machine, in combination, a tub, a flexible liner secured to said tub circumferentially adjacent the top and bottom thereof and defining a washing and drying chamber in said tub, the liner being movable inwardly during the drying operation, an oscillatory agitator mounted centrally of the bottom in said washing and drying chamber, said agitator extending outwardly beyond the lower end of said liner and being operable to wash the clothes in said washing and drying chamber, said tub being provided with fluid inlet and outlet openings communicating with said washing and drying chamber, and said tub being provided behind said liner with a fluid inlet and a fluid outlet, one of said openings that communicate with the washing and drying chamber being located above the center of the tub so that water will overflow through the same as the liner moves inwardly during the drying operation.

25. In a washing machine, in combination, a tub, a flexible liner secured to said tub circumferentially at the top and bottom thereof and defining a washing and drying chamber in said tub, the liner being movable inwardly during the drying operation, a movable agitator mounted in said washing and drying chamber, said agitator having a portion extending outwardly beyond the lower end of said liner and a second portion extending upwardly from said first portion, said tub being provided with fluid inlet and outlet openings communicating with said washing and drying chamber, and said tub being provided behind said liner with a fluid inlet and a fluid outlet, one of said openings that communicate with the washing and drying chamber being located above the center of the tub.

26. In washing apparatus, a tub having a clothes receiving chamber and an open top, the bottom of said tub having a drain outlet, a flexible diaphragm extending about the sides of said chamber and from adjacent said outlet to adjacent said top, means holding the diaphragm in the tub adjacent said top, detachable clamping means retaining the lower end of the diaphragm in place, such means and diaphragm leaving the drain outlet open to the interior of said chamber, means operable within the chamber for agitating clothes and wash water to wash clothes in said container, and means, including fluid connections to said tub behind said diaphragm, for operating said diaphragm to exhaust water from the interior of said chamber through said outlet and said top.

27. In washing apparatus, a tub having a clothes receiving chamber and an open top, a flexible diaphragm extending about the sides of said chamber and having a mounting ring connected at the upper end thereof for fixing said diaphragm to the upper portion of said tub, a second mounting ring connected to the lower end of said diaphragm and arranged to fix said diaphragm at the bottom of said chamber, means operable within the chamber for agitating clothes and wash water to wash clothes in said chamber, and means including fluid connections to said tub behind said diaphragm for operating said diaphragm.

28. In washing apparatus, a tub having a clothes receiving chamber and an open water outlet adjacent the top of the chamber, the bottom of said tub having a drain outlet, a flexible diaphragm extending about the sides of said chamber from adjacent said outlet to adjacent said top, said tub having an annular groove adjacent said top, a mounting ring connected to the upper end of the diaphragm, said ring adapted to press and fix the upper portion of said diaphragm into said groove, a second mounting ring connected to the lower end of the diaphragm, the second ring and diaphragm leaving the drain outlet open to the interior of said chamber, means including fluid connections to said tub behind said diaphragm for operating said diaphragm to exhaust water from the interior of said chamber through said outlets, an agitator arranged to operate in said chamber near the bottom thereof, and an oscillatable shaft extending through the bottom of the tub, said agitator being mounted on the upper end of said shaft.

29. In washing apparatus, a tub having a clothes receiving chamber, a flexible diaphragm fitting about the sides of the tub and leaving an opening at the top and bottom of the tub, an agitator arranged to operate in said tub near the bottom thereof, an oscillatable shaft extending through the bottom of the tub, said agitator being mounted on the upper end of said shaft, water inlet and drain connections to said tub communicating with the interior of said chamber through said bottom opening, and fluid connections to said tub in back of said diaphragm to admit fluid for operating the diaphragm.

30. In a washing machine, a tub having an open top, a flexible liner for said tub extending from adjacent the open top to adjacent the bottom of the tub, means for agitating clothes and water in the tub, a cover for said open top and having a portion engaging the liner adjacent the open top so as to aid in holding the upper end of the liner in place, and means for admitting fluid between said liner and said tub to cause the same to move substantially radially inwardly from more than one direction.

31. In a washing machine, a tub arranged to contain clothes and water, a flexible liner defining a clothes washing and drying chamber within said tub, said tub having a drain outlet through which water overflows from said chamber, the bottom of the tub having a second drain outlet opening to the interior of said chamber, a movable agitator mounted for operation near the bottom of the chamber and overlying the second drain outlet, the agitator having provision for the draining of water therethrough, and means including fluid inlet and outlet connections in back of said liner for operating said liner to exhaust water from the interior of said tub.

32. In washing apparatus as set forth in claim 31 in which there is a water inlet connection to the interior of the chamber, which inlet is also located beneath the agitator so that at least some of the incoming water passes through said agitator.

33. In a washing machine, a tub, motor operated means for agitating clothes and water in the tub, a flexible diaphragm within said tub defining a washing chamber and a pressure chamber, said diaphragm being in the form of a sleeve open at its top and bottom and secured at said top and bottom circumferentially around said tub at substantially the top and bottom thereof, a drain for the washing chamber near the top thereof, an inlet connection to said washing chamber for wash and rinse waters, fluid inlet and outlet connections to said pressure chamber, motor operated pump means adapted to supply pressure fluid to said pressure chamber, and a control for said motor operated means for causing operation of said machine in a cycle comprising washing, rinsing and squeeze drying, said control including an element for causing operation of the pump means for admission of fluid to said pressure chamber between washing and rinsing and also after rinsing to squeeze the clothes to remove water therefrom through said drain, the pump means being operated to produce greater pressure in said pressure chamber in the period following the rinse operation.

34. In a washing machine, a tub, motor operated means for agitating clothes and water in the tub, a flexible diaphragm within said tub defining a washing chamber and a pressure chamber, a drain for the washing chamber near the top thereof, an inlet connection to said washing chamber for wash and rinse waters, fluid inlet and outlet connections to said pressure chamber, valves controlling the admission of water to the washing chamber, a control element for manually opening said valves to fill the chamber with wash water, a latch for holding the valves open until a predetermined water level is obtained in said machine, a release for said latch responsive to said water level, and automatic control means for said machine including motor operated means for re-opening said valves to admit rinse water to said washing chamber, said means automatically causing reoperation of said latch to hold the valves open until a predetermined water level is reached whereupon the latch is again released to permit said valves to close.

35. In a washing machine, a tub, means for agitating clothes and water in the tub, a flexible diaphragm in the tub dividing the same into a washing chamber and a pressure chamber, fluid inlet and outlet connections to said pressure chamber, motor operated pump means for supplying pressure fluid to said chamber to operate said diaphragm to remove water from said washing chamber, the upper part of said tub having a drain outlet communicating with the upper part of said washing chamber, a trough receiving water from said outlet, said trough having a discharge opening, a gate closing said opening, and an actuator for said gate, said actuator being connected to said pump means so as to open said gate simultaneously with the admission of fluid to said pressure chamber.

*36. In a machine for washing clothes and the like and for expressing washing water therefrom, the combination of a tub for containing a body of washing water and the clothes to be washed, an agitator disposed within the tub for agitating the clothes in the body of washing water, said tub having a bottom wall and a side wall structure connected to the bottom wall and extending thereabove, said side wall structure being formed, at least in part, of flexible, deformable material which encompasses the agitator, said side wall structure defining an access opening at the upper end thereof for the ingress and egress of the fabrics, means extending through said bottom wall for actuating said agitator relative the tub, a cover for closing the access opening, means for creating a pressure differential between the inner and outer surfaces of said flexible side wall structure to force said flexible side wall*

*structure towards said agitator and means for discharging the expressed water from the interior of the tub.*

*37. A clothes washing apparatus comprising an open ended collapsible bag, a movable agitator projecting into and surrounded by the bag, means mounting the agitator for movement independently of the bag, and means for collapsing the bag, said last named means producing a differential of fluid pressure on the inside and on the outside of the bag.*

*38. A clothes washing apparatus comprising an open ended collapsible bag, a movable agitator projecting into and surrounded by the bag, means mounting the agitator for moving independently of the bag, and means for collapsing the bag, said last named means producing a differential of fluid pressure on the inside and on the outside of the bag, with a higher pressure alternately prevailing on opposite sides of said bag.*

*39. A clothes washing device comprising an open ended collapsible bag, supports for the top and bottom of the bag, a movable agitator projecting into and surrounded by the bag, means mounting the agitator for movement independently of the bag, and means for collapsing the bag, said last named means producing a differential of fluid pressure on the inside and on the outside of the bag.*

*40. A clothes washing apparatus comprising a flexible container forming a washing, rinsing and drying chamber, supports for the top and bottom of the container, an agitator mounted within said container for movement independently of said container, means for admitting washing and rinsing water to the chamber, and means for moving said container to contract the space within said chamber.*

*41. A clothes washing apparatus comprising an open ended collapsible bag, a movable agitator projecting into and surrounded by the bag, means mounting the agitator for movement independently of the bag, means for collapsing the bag, said last named means producing a differential of fluid pressure on the inside and on the outside of the bag, and a wash water outlet positioned near the upper part of the bag.*

*42. In a machine for washing fabrics and for subsequently compressing the fabrics for the expelling of water therefrom, which operations are carried out in a single enclosure, the combination of a tub including a base having a drain and a sleeve formed of deformable material defining a side wall of the tub and extending upwardly from the base, means securing the lower margin of the sleeve to the base, said sleeve being open at the top for providing access to the tub, a removable cover closing the open top of the tub, means supporting the upper margin of said sleeve, an agitator arranged within the tub and encompassed by the deformable sleeve, means including an oscillating mechanism fixed to the base and arranged below said agitator for actuating said agitator for the washing of the fabrics, and fluid translating means for subjecting the surfaces of said deformable sleeve interiorly and exteriorly of the tub to a fluid pressure differential with the pressure exteriorly of the sleeve predominating over the pressure interiorly of the sleeve, whereby the sleeve is forced generally inwardly toward the agitator for the compression of the fabrics and the expelling of water therefrom, the expelled water passing from the tub through said drain.*

*43. A machine for washing fabrics and for subsequently compressing the fabrics for the expelling of water therefrom within a single enclosure, the combination of a receptacle having a top opening and including a base having a drain, an agitator within said receptacle, an annular wall of deformable material surrounding said agitator and drain, means securing the lower extremity of said deformable wall to said base, said deformable wall being open at the top for providing access to the space interiorly thereof, a removable cover for closing said top opening, means for supporting the upper margin of said deformable wall from said receptacle, means extending through said base and including an oscillating mechanism arranged below said agitator for actuating the same to wash fabrics in the space defined by said deformable wall, and fluid translating means for subjecting the exterior and interior surfaces of said deformable wall to a fluid pressure differential with the pressure exteriorly of said deformable wall predominating over the pressure interiorly thereof whereby said deformable wall is forced inwardly toward the agitator for the compression of the fabric and the expelling of water therefrom.*

*44. A clothes washing machine comprising a receptacle having an opening in its top for the admission of clothes to be washed, a closure for said opening, said receptacle including a bottom wall and a side wall, an annular flexible wall disposed interiorly of said side wall and having fluid-tight joints with the walls of said receptacle, said flexible wall being movable inwardly towards the center of the receptacle when the fluid pressure acting on the outer surface thereof is greater than fluid pressure acting on the inner surface thereof, an agitator mounted within the space defined by said flexible wall for oscillating movement, means extending through said bottom wall for oscillating said agitator to agitate clothes and washing fluid contained in the space interiorly of said flexible wall, means for developing a difference in the pressures acting on the exterior and interior surfaces of said flexible wall to move said flexible wall inwardly toward the agitator and effect a squeezing action on the clothes contained in the space interiorly of said flexible wall and thereby express washing fluid from the clothes, and a drain conduit communicating with the space interiorly of said flexible wall to remove washing fluid from said space when said flexible wall is moved inwardly.*

*45. In a machine for washing fabrics and for expelling water therefrom by compression, the combination of a tub structure having a base, a fixed side wall extending upwardly from the base and provided with an access opening at the top side thereof, a sleeve formed of flexible material disposed within said side wall and defining an expansible chamber between the sleeve and side wall, said sleeve having an upper margin secured to the side wall peripherally of said access opening and a lower margin secured to said base, an agitator disposed within the tub and encompassed by said sleeve, means extending through the base for actuating the agitator, means for conveying fluid under pressure to said chamber for forcing said flexible sleeve inwardly of the tub to compress the intervening fabrics and expel water therefrom and means defining a drain opening in said base for the removal of expelled water from the tub.*

*46. A clothes washing machine comprising a receptacle having an opening in its top for the admission of clothes to be washed in said receptacle, a closure for said opening, said receptacle including a bottom wall, a generally vertically-extending side wall and an upper wall, said bottom wall and upper wall being contiguous with said side wall and said upper wall defining said top opening, said upper wall overlying said bottom wall and spaced thereabove, said side wall and at least portions of said upper and bottom walls contiguous with said side wall being formed of flexible material, the inner surface thereof being in contact with clothes and washing fluid contained in the receptacle, an agitator mounted within the receptacle and encompassed by said side wall, means extending through said bottom wall for oscillating said agitator to agitate clothes and washing fluid contained in the receptacle, means for developing a differential in pressure between the inner and outer surfaces of said flexible material with the higher pressure prevailing on the outer surface of said flexible material to force said flexible material inwardly toward the agitator and effect a squeezing action on clothes contained in the receptacle to express washing fluid from the clothes, said receptacle having a drain opening to remove washing fluid from the receptacle.*

References Cited in the file of this patent or the original patent

UNITED STATES PATENTS

| | | |
|---|---|---|
| 217,201 | Crawley | July 8, 1879 |
| 989,070 | Simmons | Apr. 11, 1911 |
| 1,185,041 | Ashey | May 30, 1916 |
| 1,461,914 | Kincaid | July 17, 1923 |
| 1,531,924 | Graham | Mar. 31, 1925 |
| 1,626,125 | Tilt | Apr. 26, 1927 |
| 1,724,234 | Thomas | Aug. 13, 1929 |
| 1,725,995 | Myers | Aug. 27, 1929 |

(Other references on following page)

UNITED STATES PATENTS

| | | |
|---|---|---|
| 1,741,685 | Dunham | Dec. 31, 1929 |
| 1,747,763 | Dunham | Feb. 18, 1930 |
| 1,748,296 | Lombard | Feb. 25, 1930 |
| 1,892,441 | Wales et al. | Dec. 27, 1932 |
| 1,897,414 | Baldner | Feb. 14, 1933 |
| 1,950,732 | Kirby | Mar. 13, 1934 |
| 1,966,241 | Furrer | July 10, 1934 |
| 2,049,057 | Geldhof et al. | July 28, 1936 |
| 2,064,787 | Ducker | Dec. 15, 1936 |
| 2,099,365 | Kemper | Nov. 16, 1937 |
| 2,119,918 | Kirby | June 7, 1938 |
| 2,126,365 | Alexopoulos | Aug. 9, 1938 |
| 2,135,084 | Kirby | Nov. 1, 1938 |
| 2,142,995 | Busi | Jan. 10, 1939 |

| | | |
|---|---|---|
| 2,157,695 | Fulton | May 9, 1939 |
| 2,161,022 | De Marco | June 6, 1939 |
| 2,178,385 | Alward | Oct. 31, 1939 |
| 2,235,645 | Rocke | Mar. 18, 1941 |
| 2,254,003 | De Marco | Aug. 26, 1941 |
| 2,279,878 | Suits et al. | Apr. 14, 1942 |
| 2,331,897 | Dyer | Oct. 19, 1943 |
| 2,335,560 | Crane | Nov. 30, 1943 |
| 2,407,660 | Graham | Sept. 17, 1946 |
| 2,449,634 | Baade | Sept. 21, 1948 |

FOREIGN PATENTS

| | | |
|---|---|---|
| 456,093 | Germany | Feb. 15, 1928 |
| 648,293 | Germany | July 28, 1937 |
| 666,463 | Germany | Oct. 20, 1938 |